United States Patent [19]
Yamamoto et al.

[11] Patent Number: 5,147,947
[45] Date of Patent: Sep. 15, 1992

[54] POLYORGANOSILOXANE SERIES THERMOPLASTIC RESIN AND COMPOSITION THEREOF

[75] Inventors: Yuji Yamamoto; Takashi Kurata; Kazuyoshi Nakazawa; Yusuke Tsuda, all of Tokyo; Junichiro Watanabe, Gunma; Makoto Matsumoto, Gunma; Akitsugu Kurita, Gunma; Yuichi Funahashi, Gunma, all of Japan

[73] Assignees: Japan Synthetic Rubber Co., Ltd.; Toshiba Silicone Co., Ltd., Tokyo, Japan

[21] Appl. No.: 429,551

[22] Filed: Oct. 31, 1989

[30] Foreign Application Priority Data

Oct. 31, 1988 [JP] Japan .................. 63-274727
Oct. 31, 1988 [JP] Japan .................. 63-274728
Nov. 8, 1988 [JP] Japan .................. 63-281603
Nov. 18, 1988 [JP] Japan .................. 63-290128

[51] Int. Cl.$^5$ .......................... C08F 283/12
[52] U.S. Cl. ...................... 525/479; 525/63; 525/393; 525/431; 525/446; 525/464; 525/474; 525/476; 528/25
[58] Field of Search .................. 525/479; 528/25

[56] References Cited

U.S. PATENT DOCUMENTS

| | | | |
|---|---|---|---|
| 4,373,060 | 2/1983 | Ching | 524/767 |
| 4,868,251 | 9/1989 | Reich et al. | 525/479 |
| 4,873,298 | 10/1989 | Ryntz | 525/479 |
| 4,927,884 | 5/1990 | Iwasawa et al. | 525/195 |

FOREIGN PATENT DOCUMENTS

250093 12/1987 European Pat. Off. .
3838330 6/1989 Fed. Rep. of Germany .
1228366 4/1960 France .

Primary Examiner—John C. Bleutge
Assistant Examiner—R. Dean, Jr.
Attorney, Agent, or Firm—Oblon, Spivak, McClelland, Maier & Neustadt

[57] ABSTRACT

A polyorganosiloxane series thermoplastic resin comprising a graft copolymer obtained from a vinyl monomer and a modified polyorganosiloxane, and a thermoplastic resin composition containing the same. The resin and the composition thereof have excellent slidability, abrasion resistance, weather resistance, cold resistance and impact resistance, and can be applied to new fields such as sliding parts, parts for cold district, outdoor parts, etc.

15 Claims, No Drawings

POLYORGANOSILOXANE SERIES THERMOPLASTIC RESIN AND COMPOSITION THEREOF

FIELD OF THE INVENTION

This invention relates to a polyorganosiloxane series thermoplastic resin containing efficiently graft polymerized vinyl monomer(s) and having remarkably excellent slidability, abrasion resistance, weather resistance, cold resistance, and impact resistance.

BACKGROUND OF THE INVENTION

Hitherto, for improving the impact strength of a thermoplastic resin, a technique of modifying the resin by rubber has been established.

For example, there are an ABS resin obtained by reinforcing a styrene-acrylonitrile resin (AS resin) with a butadiene rubber and an AAS resin obtained by reinforcing as AS resin with an acrylic rubber.

As such a base rubber component, a silicone rubber is considered but when polyorganosiloxane is simply compounded with a thermoplastic resin, the compounded product is insufficient in impact resistance since these components are inferior in compatibility with each other. Thus, a technique of grafting a vinyl monomer on a rubber as in an ABS resin is required, but a polyorganosiloxane is generally poor in a reactivity with a vinyl monomer and hence it is not easy to form a graft polymer of a polyorganosiloxane. Thus, for forming the graft copolymers of this kind, several methods are proposed.

For example, it is proposed in JP-A 50-109282 (the term "JP-A" as used herein means an "unexamined published Japanese patent application") that a graft copolymer having an improved impact strength is obtained by polymerizing a vinyl monomer in the presence of a polyorganosiloxane having a vinyl group or an allyl group.

A method of improving the impact strength of a vinyl polymer by using a polyorganosiloxane having a mercapto group in place of the polyorganosiloxane having a vinyl group or an allyl group is also proposed in JP-A-52-130885.

Furthermore, it is proposed in JP-A-60-252613, JP-A-61-106614, and JP-A-61-136510 that a graft copolymer having an excellent impact strength is obtained with a high graft efficiency by polymerizing a vinyl monomer in an emulsion of a polyorganosiloxane having an acryl group or a methacryl group.

However, when the polyorganosiloxane having a vinyl group or an allyl group or the polyorganosiloxane having a mercapto group is used, the polyorganosiloxane is poor in a reactivity with a vinyl monomer. Accordingly, an apparent graft ratio calculated from an amount of a gel formed, that is, a ratio of the grafted vinyl polymer to the amount of the polyorganosiloxane, is small.

Therefore, an interface adhesive strength between such a polyorganosiloxane and a vinyl polymer is low, thereby causing a remarkable delamination, whereby there is a problem that a graft copolymer having good appearance and a sufficient impact strength cannot be obtained.

Also, when the polyorganosiloxane having an acryl group or a methacryl group is used, a graft copolymer having an improved impact strength is obtained, but the heat stability thereof is poor and the graft ratio is greatly lowered by the high-temperature molding and the retention during molding. Consequently, the impact strength, appearance, and luster of the moldings are greatly reduced.

SUMMARY OF THE INVENTION

The present invention has been made under such circumstances of the conventional techniques.

Accordingly, one object of this invention is to provide a polyorganosiloxane series thermoplastic resin having excellent weather resistance, cold resistance, slidability, and abrasion resistance with an excellent graft reactivity.

Another object of this invention is to provide a thermoplastic resin composition comprising the polyorganosiloxane series thermoplastic resin and other thermoplastic resin(s).

The polyorganosiloxane series thermoplastic resin according to this invention (hereinafter sometimes referred to as simply "the thermoplastic resin") comprises a graft copolymer (V) (hereinafter sometimes referred to as "component (V)") obtained by grafting at least one kind of vinyl monomer (IV) (hereinafter sometimes referred to as "component (IV)") onto a modified polyorganosiloxane (III) (hereinafter sometimes referred to as "component (III)"), the component (III) being obtained by condensing from 90 to 99.8% by weight of organosiloxane (I) (hereinafter sometimes referred to as "component (I)") having a structural unit represented by the formula (A)

$$R^1{}_n SiO_{(4-n)/2} \qquad (A)$$

wherein $R^1$ represents a substituted or unsubstituted monovalent hydrocarbon group and n represents 0 or an integer of from 1 to 3, and from 10 to 0.2% by weight of a graft crosslinking agent (II) (hereinafter sometimes referred to as "component (II)") having both an unsaturated group represented by the following formula (B)

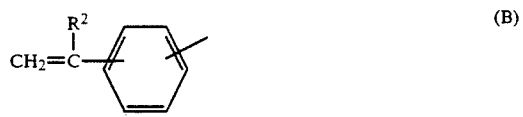

$$(B)$$

wherein $R^2$ represents a hydrogen atom or an alkyl group having from 1 to 6 carbon atoms, and an alkoxysilyl group, the sum of component (I) and component (II) being 100% by weight.

DETAILED DESCRIPTION OF THE INVENTION

The organosiloxane (I) used in this invention has the structural unit shown by the above-described formula (A) and has a straight chain, branched or cyclic structure, and is preferably the organosiloxane having a cyclic structure.

In formula (A) described above, $R^1$ represents a substituted or unsubstituted monovalent hydrocarbon group as described above, and examples of the monovalent hydrocarbon group are a methyl group, an ethyl group, a propyl group, a vinyl group, a phenyl group and those groups each substituted with a halogen atom or a cyano group.

Further, in the formula (A), n is 0 or an integer of from 1 to 3.

Specific examples of the organosiloxane (I) are cyclic organosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane, etc., and straight chain and branched organosiloxanes.

In addition, the organosiloxane (I) may be a previously condensed polyorganosiloxane having a weight average molecular weight of from about 500 to 10,000 calculated as a polystyrene.

When the organosiloxane (I) is a polyorganosiloxane, the terminal of the molecular chain may be blocked by, e.g., a hydroxy group, an alkoxy group, a trimethylsilyl group, a dimethylvinylsilyl group, a methylphenylvinylsilyl group, a methyldiphenylsilyl group, etc.

The graft crosslinking agent (II) used in this invention is a compound having the unsaturated group shown by the formula (B) described above and an alkoxysilyl group.

In the formula (B), $R^2$ is a hydrogen atom or an alkyl group having from 1 to 6 carbon atoms. Preferred of those is a hydrogen atom or an alkyl group having from 1 or 2 carbon atoms, and more preferred is a hydrogen atom or a methyl group.

Specific examples of the graft crosslinking agent are p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)-propylmethyldiethoxysilane, 3-(p-vinylbenzoyloxy)-propylmethyldimethoxysilane, 1-(o-vinylphenyl) 1,1,2-trimethyl-2,2-dimethoxydisilane, 1-(p-vinylphenyl)-1,1-diphenyl-3-ethyl-3,3-diethoxydisiloxane, m-vinylphenyl-[3-(triethoxysilyl)propyl]diphenylsilane, [3-(p-isopropenylbenzoylamino)propyl]phenyldipropoxysilane and mixtures thereof.

Of those, p-vinylphenylmethyldimethoxysilane, 2-(p-vinylphenyl)ethylmethyldimethoxysilane, and 3-(p-vinylbenzoyloxy)propylmethyldimethoxysilane are preferred, and p-vinylphenylmethyldimethoxysilane is more preferred.

The amount of the graft crosslinking agent, component (II), used is from 0.2 to 10% by weight, and preferably from 0.2 to 5% by weight, based on the sum of component (I) and component (II). If the amount thereof is less than 0.2% by weight of the sum, a high graft ratio is not obtained in the graft polymerization of the modified polyorganosiloxane (III) and the vinyl monomer (IV). As a result, the interface adhesive strength between the modified polyorganosiloxane (III) and the vinyl polymer grafted thereto is decreased, thereby causing delamination, and the graft copolymer (V) having a sufficient impact strength cannot be obtained.

On the other hand, if the amount of the graft crosslinking agent (II) is more than 10% by weight of the sum, the graft ratio is increased, but the degree of polymerzation of the grafted vinyl polymer is reduced with the increase of the graft crosslinking agent (II) to reduce the molecular weight of the vinyl polymer, and as a result, a sufficient impact strength cannot be obtained.

On the other hand, the graft copolymer to a silicone polymer tends to deteriorate by light oxidation up to a deep portion of the grafted vinyl polymer due to the high light transmittance and high gas permeability (oxygen) of silicone.

To overcome these problems, a function as a UV absorbing layer may be imparted to the silicone by adding an ultraviolet (UV) absorber.

However, if the UV absorber is simply added, the existence of the UV absorber is predominated in the side of the vinyl polymer having a high compatibility with the UV absorber since there is a difference in compatibility of the UV absorber for the siloxane and the vinyl polymer, and a sufficient effect as the UV absorbing layer for the silicone cannot be obtained.

To overcome this problem, it is preferred to chemically combine a UV absorber with the siloxane and in this case, it is preferred to introduce a group containing a UV absorbing group into the siloxane as RI in the formula (A) described above.

The group having the UV absorbing group includes a group represented by the following formula

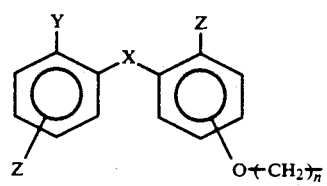

wherein X represents >C=O or

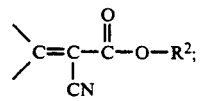

Y represents H or OH; Z represents H, OH, or $OR^2$; and n represents an integer of from 1 to 5 ($R^2$ described above is an alkyl group having 1 to 18 carbon atoms); with proviso that when Y is H, at least one Z is OH.

More practically, the group shown by the following formula is preferred.

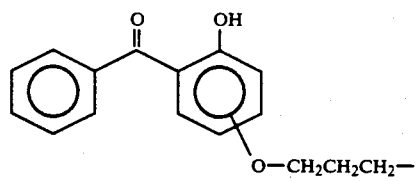

The content of the group having the UV absorbing group is from 0.02 to 10% by weight, and preferably form 0.1 to 5% by weight, based on the total amount of the organic groups bonded to the silicon atom. If the content is less than 0.02% by weight, the effect in ultraviolet resistance is insufficient, while if the content is more than 10% by weight, the heat resistance is reduced in the case of using as a composite material by blending the thermoplastic resin with other organic polymer.

Specific examples of the organic silicon compound (VI) (hereinafter sometimes referred to as "component (VI)") having such a UV absorbing group are

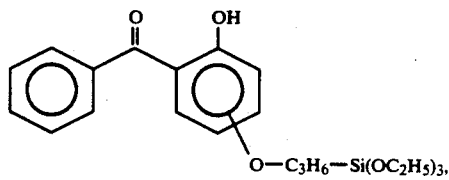

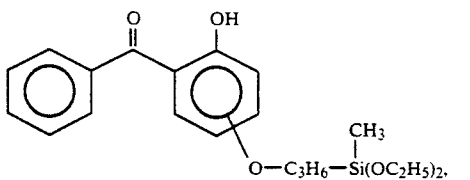

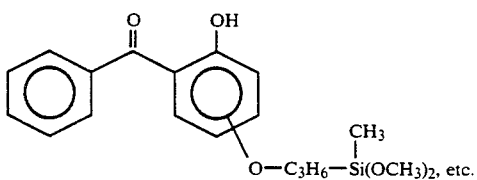

and the following organic silicon compound is preferred

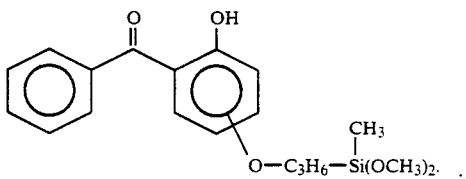

In the case of forming the polyorganosiloxane as component (III) by polycondensing the organosiloxane (an organosiloxane (I') having the structural unit represented by the following formula (A')

$$R^3{}_n Si_{(4-2)/2} \qquad (A')$$

wherein $R^3$ represents a substituted or unsubstituted monovalent hydrocarbon group and n represents O or an integer of from 1 to 3 (hereinafter sometimes referred to as "component (I')"), the organosilicon compound (component (II)) and the UV absorbing group-containing organosilicon compound (component (VI)), component (II) and component (VI) are compounded with component (I') such that the contents of the reactive unsaturated group in component (II) and the UV absorbing group in component (VI) become from 0.02% to 10% of the total amount of the organic groups bonded to the silicon atom of component (III).

The compounding of these components is conducted, for example, such that they are compounded in the amounts of from 80 to 99,6% by weight of the organosiloxane as component (I'), from 10 to 0.2% by weight, preferably from 7 to 0.5% by weight, and more preferably from 5 to 1% by weight, of the organic silicon compound as component (II), and from 10 to 0.2% by weight, preferably from 7 to 0.5% by weight, and more preferably from 5 to 1% by weight, of the UV absorbing group-having organic silicon compound as component (VI), the sum of component (I'), component (II) and component (VI) being 100% by weight.

By polycondensing the above components, the desired polyorganosiloxane can be obtained.

In this invention, the modified organosiloxane (III) can be produced by mixing under shearing the organosiloxane (I) and the graft crosslinking agent (II) in the presence of an emulsifying agent such as an alkylbenzenesulfonic acid, etc., using a homomixer, and condensing them. The emulsifying agent functions as an emulsifying agent for the organosiloxane (I) and also as a condensation initiator.

Examples of the emulsifying agent are an aliphatic substituted naphtalenesulfonic acid, an aliphatic sulfonic acid, a silylalkylsulfonic acid, and aliphatic substituted diphenyl ether sulfonic acid, each aliphatic group having a carbon length of from 6 to 18 carbon atoms.

Further, nonionic emulsifying agnets such as polyoxyethylene alkyl ester, polyoxyethylene alkylaryl ether, etc., can be added.

The amount of the emulsifying agent used is usually from 0.1 to 5% by weight, and preferably from about 0.3 to 3% by weight, based on the sum of component (I) and component (II).

In addition, water is used in the production of the organosiloxane, and the amount of water is usually from 100 to 500 parts by weight, and preferably from 200 to 400 parts by weight, per 100 parts by weight of the sum of component (I) and component (II).

The condensation temperature is usually from 5° to 100° C.

In addition, in the case of producing the modified polyorganosiloxane (III), a crosslinking agent can be added to the system as the third component for improving the impact resistance of the resin obtained. Examples of the crosslinking agent are trifunctional crosslinking agents such as methyltrimethoxysilane, phenyltrimethoxysilane, ethyltriethoxysilane, etc., and tetrafunctional crosslinking agents such as tetraethoxysilane, etc. The amount of the crosslinking agent added is usually about 10% by weight or less, and preferably about 5% by weight or less, based on the sum of the organosiloxane (I) and the graft crosslinking agent (II).

In addition, the weight average molecular weight (calculated as a polystyrene) of the modified polyorganosiloxane (III) thus obtained is usually from 10,000 to 5,000,000, preferably from 30,000 to 1,000,000, and more preferably from 50,000 to 300,000.

By graft polymerizing the vinyl monomer (IV) onto the modified polyorganosiloxane (III) thus obtained, the polyorganosiloxane series thermoplastic resin of this invention containing the graft copolymer (V) is obtained.

Examples of the vinyl monomer (IV) which is used to obtain the thermoplastic resin of this invention are aromatic alkenyl compounds such as styrene, α-methylstyrene, sodium styrenesulfonate, etc.; methacrylic acid esters such as methyl methacrylate, ethyl methacrylate, 2-ethylhexyl methacrylate, butyl methacrylate, allyl methacrylate, hydroxyethyl methacrylate, dimethylaminoethyl methacrylate, etc.; acrylic acid esters such as methyl acrylate, ethyl acrylate, butyl acrylate, etc.; vinyl cyanide compounds such as acrylonitrile, methacrylonitrile, etc.; olefins such as ethylene, propylene, etc.; conjugated diolefins such as butadiene, isoprene, chloroprene, etc.; and vinyl acetate, vinyl chloride, vinylidene chloride, triallyl isocyanurate, acrylic acid, methacrylic acid, N-phenylmaleimide, N-cyclohexylmaleimide, maleic anhydride, etc. Those may be used alone or as mixture thereof.

The graft copolymer (V) containing from 65 to 75% by weight styrene and from 35 to 25% by weight acrylonitrile as the vinyl monomers (IV) is preferred for improving the impact resistance of the polyorganosiloxane series thermoplastic resin of this invention.

In addition, in the case of graft polymerizing the vinyl monomer (IV) onto the modified polyorganosiloxane (III), the proportion of the component (III) is from 5 to 80% by weight, and preferably from 10 to 60% by weight, and the proportion of the component (IV) is from 95 to 20% by weight, and preferably from 90 to 40% by weight, the sum of the component (III) and the component (IV) being 100% by weight.

If the proportion of the component (III) is less than 5% by weight, a sufficient impact strength cannot be obtained, while if the proportion of the component (III) is more than 80% by weight, the proportion of the vinyl polymer to be graft bonded is reduced, thereby a sufficient interlayer adhesive strength cannot be obtained between the modified polyorganosiloxane (III) and the vinyl polymer, and as a result, the thermoplastic resin obtained is inferior in appearance and impact strength.

The graft ratio of the graft copolymer (V) thus obtained is usually about 20% by weight or more, preferably about 80% by weight or more, and more preferably about 100% by weight or more.

When the graft ratio of the graft copolymer (V) is high as described above, the interface adhesive strength between the graft copolymer and the vinyl polymer which was not directly grafted thereto is increased, and the modified polyorganosiloxane (III) is uniformly dispersed in the vinyl polymer to provide the thermoplastic resin having good appearance and an excellent impact strength.

The thermoplastic resin of this invention further contains, in addition to the graft copolymer (V) thus obtained, a vinyl polymer which is an ungrafted polymer of the vinyl monomer (IV), and the content of the graft copolymer (V) in the thermoplastic resin is usually 5% by weight or more, and preferably 10% by weight or more.

In the production of the thermoplastic resin of this invention, the vinyl monomer (IV) is graft-polymerized to the modified polyorganosiloxane (III) by a conventional radical polymerization to provide a composition containing the graft copolymer (V).

In this case, according to the kind of a radical polymerization initiator used, it is necessary to neutralize with alkali a latex of the modified polyorganosiloxane which is acidic by the alkylbenzenesulfonic acid as described above. Examples of the alkali for neutralizing the acid latex are sodium hydroxide, potassium hydroxide, sodium carbonate, sodium hydrogencarbonate, triethanolamine, triethylamine, etc.

Examples of the radical polymerization initiator used are redox series initiators composed of a combination of an oxidizing agent such as cumene hydroperoxide, diisopropylbenzene hydroperoxide, p-menthane hydroperoxide, etc., and a reducing agent such as a saccharose-containing iron pyrophosphate composition, a sulfoxylate composition, a mixed composition of a saccharose-containing iron pyrophosphate composition and a sulfoxylate composition, etc.; persulfates such as potassium persulfate, ammonium persulfate, etc.; azo compounds such as azobisisobutyronitrile, dimethyl-2,2'-azobisisobutyrate, 2-carbamoylazoisobutyronitrile, etc.; and organic peroxides such as benzoyl peroxide, lauroyl peroxide, etc. Of these initiators, the redox series initiators are preferred.

The amount of the radical polymerization initiator used is usually from 0.05 to 5 parts by weight, and preferably from 0.1 to 3 parts by weight, per 100 parts by weight of the vinyl monomer (IV).

In this case, the radical polymerization is preferably carried out by an emulsion polymerization or a solution polymerization.

In conducting the emulsion polymerization, a conventional emulsifying agent, the above-described radical polymerization initiator, a chain transfer agent, etc., are used.

Examples of the emulsifying agent are anionic emulsifying agents such as sodium dodecylbenzenesulfonate, sodium laurylsulfate, sodium diphenyl ether disolfonate, succinic acid dialkali ester sodium sulfonate, etc.; and nonionic emulsifying agents such as polyoxyethylene alkyl ester, polyoxyethylene alkylaryl ether, etc. They can be used alone or as a combination thereof.

The amount of the emulsifying agent is usually from about 0.5 to 5% by weight based on the weight of the vinyl monomer (IV).

Examples of the chain transfer agent are mercaptans such as t-dodecylmercaptan, octhylmercaptan, n-tetradecylmercaptan, n-hexylmercaptan, etc., and halogen compounds such as carbon tetrachloride, ethylene bromide, etc.

The amount of the chain trasfer agent is usually from 0.02 to 1% by weight based on the weight of the vinyl monomer (IV).

The emulsion polymerization is carried out at a polymerization temperature of from 5° C. to 100° C., and preferably from 50° C. to 90° C., for a polymerization time of from 0.1 hour to 10 hours using the radical polymerization initiator, the emulsifying agent and the chain transfer agent in the amounts defined above together with water in an amount of usually from 100 to 500 parts by weight to 100 parts by weight of the vinyl monomer (IV) and, if necessary, an electrolyte, a pH controlling agent, etc.

In addition, the emulsion polymerization can be practiced by adding the vinyl monomer (IV) and the radical polymerization initiator to the latex containing the modified polyorganosiloxane (III) obtained by the condensation of the organosiloxane (I) and the graft crosslinking agent (II).

On the other hand, in the case of the solution polymerization, the modified polyorganosiloxane (III) and the vinyl monomer (IV) are dissolved in an organic solvent and the radical polymerization is conducted by adding thereto the radical polymerization initiator and, if necessary, the chain transfer agent, etc. .

Examples of the organic solvent which is used for the solution polymerization are toluene, n-hexane, cyclohexane, chloroform, tetrahydrofuran, etc.

The solution polymerization is carried out at a polymerization temperature of from 5° C. to 150° C., and preferably from 50° C. to 130° C., for a polymerization time of from 1 hour to 10 hours using the radical polymerization initiator and, if necessary, the chain transfer agent, etc., in the amounts as defined above together with, usually, an organic solvent in an amount of from 80 to 500 parts by weight per 100 parts by weight of the vinyl monomer (IV).

In the case of the solution polymerization, the formation of impurities is greatly reduced as compared to the case of the emulsion polymerization.

In the case of producing the polyorganosiloxane series thermoplastic resin of this invention by the emulsion polymerization, the product is usually coagulated by a salting out method and the powdery product thus obtained is purified by washing with water, followed by drying.

In the case of the solution polymerization, unreacted monomers and the solvent are removed from the reaction mixture by a steam distillation and the massive resin obtained is finely ground and dried for purification of the product.

The thermoplastic resin of this invention containing the graft copolymer (IV) obtained by each method described above can be formed into pellets by a kneading machine such as an extruder, etc.

In this case, according to the required performance, other conventional polymer can be properly blended with the thermoplastic resin obtained in an amount of about 99% by weight or less, and preferably about 90% by weight or less, to provide a polyorganosiloxane series thermoplastic resin composition (this blend is also referred to as "thermoplastic resin composition").

Examples of the conventional polymer which can be used with the thermoplastic resin of this invention are diene series rubbers such as polybutadiene, a butadiene-styrene copolymer, an acrylonitrile-butadiene copolymer, polyisoprene, natural rubbers, etc.; olefinic rubbers such as acrylic rubber, a ethylene-propylene copolymer, an ethylene-propylene-diene copolymer, chlorinated butyl rubber, chlorinated polyethylene, etc.; aromatic vinyl conjugated diene series block copolymers such as a styrene-butadiene block copolymer, a styrene-butadiene-styrene block copolymer, a styrene-butadiene-styrene radial tereblock copolymer, etc.; hydrogenated products of those block copolymers; polypropylene, polyethylene, polystyrene, a styrene-acrylonitrile copolymer, rubber-reinforced polystyrene (HIPS), an acrylonitrile-butadiene-styrene resin (ABS resin), an acrylonitrile-ethylenepropylene-styrene resin (AES resin), a methyl methacrylate-butadiene-styrene resin (MBS resin), an acrylonitrile-butadiene-methyl methacrylate-styrene resin, an acrylonitrile-n-butyl acrylate-styrene resin (AAS resin), polyvinyl chloride, polycarbonate, polyethylene terephthalate, polybutylene terephthalate, polyacetal, polyamide, an epoxy resin, polyvinylidene fluoride, polysulfone, and ethylene-vinyl acetate copolymer, a PPS resin, polyether ether ketone, a PPO resin, polyacrylate, a styrene-methyl methacrylate copolymer, a styrene-maleic anhydride copolymer, a rubber-modified PPO resin, a styrene-maleimide series copolymer, a rubber-modified styrene-maleimide copolymer, a polyamide series elastomer, and a polyester series elastomer.

The pellets of the thermoplastic resin (composition) are molded by a conventional means such as compression molding, injection molding, etc.

In the thermoplastic resin composition comprising the thermoplastic resin containing the graft copolymer (V) and other polymer as described above, by using the vinyl monomer having a carboxyl group or an epoxy group and other vinyl monomer as the graft monomers to the graft copolymer (V), the thermoplastic resin shows an excellent compatibility with other polymer used.

In particular, when the thermoplastic resin composition is formed using a polymer having a polarity, such as polyamide and polyester, as the polymer, the thermoplastic resin and the polymer are excellent in compatibility with each other and the composition having excellent physical properties can be obtained.

Examples of the carboxyl group-containing unsaturated vinyl monomer are acrylic acid, methacrylic acid, crotonic acid, cinnamic acid, itaconic acid, maleic acid, and acid anhydrides such as maleic anhydride, etc. Of those, acrylic acid and methacrylic acid are preferred.

Examples of the epoxy group-containing vinyl monomer are glycidyl methacrylate, glycidyl acrylate, vinyl glycidyl ether, allyl glycidyl ether, a glycidyl ether of hydroxyalkyl (meth)acrylate, a glycidyl ether of polyalkyleneglycol (meth)acrylate, and glycidyl itaconate.

Examples of the other vinyl monomer which is used together with the carboxyl group- or epoxy group-containing vinyl monomer as the graft monomers to the graft copolymer (V) are aromatic alkenyl compounds such as styrene, α-methylstyrene, vinylxylene, monochlorostyrene, dichlorostyrene, monobromostyrene, dibromostyrene, p-butylstyrene, ethylstyrene, vinylnaphthalene, o-methylstyrene, p-methylstyrene, dimethylstyrene, sodium styrenesulfonate, etc.; methacrylic acid esters such as methyl methacrylate, ethyl methacrylate, 2-ethylhexyl methacrylate, butyl methacrylate, allyl methacrylate, hydroxyethyl methacrylate, dimethylaminoethyl methacrylate, etc.; acrylic acid esters such as methyl acrylate, ethyl acrylate, butyl acrylate, etc.; vinyl cyanide compounds such as acrylonitrile, methacrylonitrile, etc.; olefins such as ethylene, propylene, etc.; conjugated diolefins such as butadiene, isoprene, chloro prene, etc.; vinyl acetate, vinyl chloride, vinylidene chloride, triallyl isocyanurate, and maleimides such as N phenylmaleimide, N-methylmaleimide, N-ethylmaleimide, N-o-chlorophenylmaleimide, N-cyclohexylmaleimide, etc. They may be used alone or as a mixture thereof.

In the case of graft polymerizing the carboxyl group-containing or epoxy group-containing vinyl monomer and other vinyl monomer to the polyorganosiloxane series polymer, the proportion of the polyorganosiloxane series polymer is from 5 to 90% by weight, preferably from 10 to 70% by weight, and more preferably from 20 to 60% by weight, and the sum of the proportions of the vinyl monomers is from 95 to 10% by weight, preferably from 90 to 30% by weight, and more preferably from 80 to 40% by weight.

If the proportion of the polyorganosiloxane series polymer is less than 5% by weight, a sufficient impact strength is not obtained, while if the proportion thereof is more than 90% by weight, a preferred powder of the graft copolymer is not obtained and the powder is not dispersed at blending the copolymer.

In addition, the content of the polyorganosiloxane in the whole composition is preferably from 5 to 30% by weight. If the content is less than 5% by weight, a sufficient impact strength is not obtained, while if the content is more than 30% by weight, the heat resistance is sometimes reduced.

The content of the carboxyl group-containing vinyl monomer and/or the epoxy group-containing vinyl monomer in the graft copolymer is preferably from 0.05 to 30% by weight, and more preferably from 0.1 to 20% by weight. If the content is less than 0.05% by weight, the compatibility increasing effect for the graft copolymer with a resin such as polyphenylene sulfide, etc., is decreased, while if the content is more than 30% by weight, the degree of gelation is increased and the extrusion moldability of the thermoplastic resin (composition) obtained becomes sometimes difficult. Other vinyl monomer described above is not an essential component in this invention, but from the relationship between the amount of the organosiloxane series copolymer in the graft polymer and the amount of the carboxyl group-containing or epoxy-containing vinyl monomer, it is preferred to use other vinyl monomer in the amount of giving the above-described proportion of the carboxyl group-containing or epoxy group-containing vinyl monomer in the graft polymer.

In particular, the weight ratio of the carboxyl group-containing vinyl monomer/other vinyl monomer is preferably from 0.5/99.5 to 95/5 and more preferably from 1/99 to 90/10.

Furthermore, the content of the carboxyl group-containing vinyl monomer and/or the epoxy group-containing vinyl monomer in the whole component is preferably from 0.01 to 5% by weight, more preferably from 0.02 to 4% by weight, and particularly preferably from 0.1 to 3% by weight. If the content thereof is less than 0.01% by weight, the compatibility increasing effect for the graft copolymer with, for example, a polyphenylene sulfide series resin is reduced, while if the content is more than 5% by weight, the degree of gelation is increased and extrusion molding becomes sometimes unapplicable.

Furthermore, the graft ratio of the vinyl monomer to the polyorganosiloxane series copolymer in the graft copolymer is preferably 10% by weight or more. If the graft ratio is less than 10% by weight, the appearance of the molded product is sometimes undesirably reduced.

The proportion of the graft copolymer (A) in the thermoplastic resin composition of this invention is from 5 to 90% by weight, preferably from 10 to 80% by weight, and more preferably from 15 to 70% by weight. If the proportion thereof is less than 5% by weight, the impact resistance of the thermoplastic resin composition obtained is reduced, while if the proportion is more than 90% by weight, the heat resistance and the chemical resistance of the composition are reduced.

When the graft copolymer obtained by graft polymerizing carboxyl group- or epoxy group-containing vinyl monomer to the polyorganosiloxane series polymer is used, the preferred thermoplastic resin compositions containing the graft copolymer and other polymer are as follows.

A thermoplastic resin composition comprising (A) from 5 to 90% by weight, and preferably from 10 to 80% by weight, of the graft copolymer obtained by graft copolymerizing from 95 to 10% by weight of sum of the epoxy group-containing vinyl monomer and the other vinyl monomer to from 5 to 90% by weight of the modified polyorganosiloxane (III) and (B) from 10 to 95% by weight, and preferably from 20 to 90% by weight, of at least one kind of a thermoplastic resin selected from a polyphenylene sulfide series resin, a polyamide series resin, a polyester series resin, a polycarbonate series resin, a vinyl chloride series resin, an olefinic resin, a polyacetal series resin, a polyarylate series resin, and a polyphenylene ether series resin;

A thermoplastic resin composition comprising (A) from 5 to 90% by weight, and preferably from 10 to 80% by weight, of the graft polymer obtained by graft polymerizing from 95 to 10% by weight of sum of the carboxyl group-containing vinyl monomer and the other vinylic monomer to from 5 to 90% by weight of the modified polyorganosiloxane (III), (B) from 0 to 80% by weight, and preferably from 5 to 60% by weight, of the graft copolymer obtained by graft polymerizing from 95 to 10% by weight of the vinyl monomer excluding the carboxyl group-containing vinyl monomer to from 5 to 90% by weight of the polyorganosiloxane series polymer, (C) from 0 to 80% by weight, and preferably from 3 to b 70% by weight, of a styrene series resin, and (D) from 10 to 90% by weight, and preferably from 20 to 80% by weight, of at least one kind of a thermoplastic resin selected from a polyamide series resin, a polyester series resin, a polycarbonate series resin, a vinyl chloride series resin, an olefin series resin, a polyacetal series resin, a polyphenylene sulfide series resin, a polyarylate series resin, and a polyphenylene ether series resin.

The styrene series resin (C) may be a composition composed of a resin obtained by polymerizing a monomer as a resin component in the presence of a rubbery polymer and a resin obtained by polymerizing a monomer as a resin component in the absence of the rubbery polymer.

Specific examples of the styrene series resin (C) are an acrylonitrile-butadiene rubber-styrene resin (ABS resin), an acrylonitrile-ethylenepropylene series rubber-styrene resin (AES resin), an acrylonitrile-butadiene-methyl methacrylate-styrene resin (ABSM resin), an acrylonitrile-styrene copolymer (AS resin), a methyl methacrylate-styrene copolymer (MS resin), high impact polystyrene (HIPS), an acrylonitrile-n-butyl acrylate rubber-styrene resin (AAS resin), etc.

For obtaining the thermoplastic resin composition of this invention described above, the above-described components (A), (B), etc., are mixed by, for example, a mixer and the mixture is melt-kneaded by an extruder at a temperature of from 200° C. to 320° C. and is formed into pellets. Furthermore, in a simple procedure, the above-described components can be directly melt-kneaded in a mold and molded into pellets.

The thermoplastic resin composition of this invention may, if necessary, contain an antioxidant such as 2,6-di-t-butyl-4-methylphenol, 2-(1-methylcyclohexyl)-4,6-dimethylphenol, 2,2-methylenebis-(4-ethyl-6-t-butylphenol), tris(di-nonylphenyl) phosphite, etc.; an ultraviolet absorber such as p-t-butylphenyl salicylate, 2,2'-dihydroxy-4-methoxybenzophenone, 2-(2'-hydroxy-4-m-octoxyphenyl)benzotriazole, etc.; a lubricant such as paraffin wax, stearic acid, hardened oil, stearoamide, methylenebis-stearoamide, n-butyl stearate, ketone wax, octyl alcohol, hydroxystearic acid triglyceride, etc.; a flame retarder such as antimony oxide, chloroplatinic acid, aluminum hydroxide, zinc borate, tricresyl phosphate, tris(dichloropropyl) phosphate, chlorinated paraffin, tetrabromobutane, hexabromobenzene, tetrabrombisphenol A, etc.; an antistatic agent such as stearoamide propyldimethyl-β-hydroxyethyl ammonium nitrate, etc.; a coloring inhibitor such as titanium oxide, carbon black, etc.; a filler such as calcium carbonate, clay, silica, glass fibers, glass balls, carbon fibers, etc.; a pigment, etc.

The pellets of the thermoplastic resin composition thus formed are molded by a conventional means such as compression molding, injection molding, etc.

As described above, the thermoplastic resin of this invention contains the graft copolymer formed by graft polymerizing a vinyl monomer to the modified polyorganosiloxane having bonded thereto a specific graft crosslinking agent, so that the graft polymerization of the vinyl monomer tends to occur as compared with the case of using a conventional polyorganosiloxane and the graft copolymer contained therein is formed with very high graft ratio and graft efficiency. Therefore, the thermoplastic resin of this invention containing the graft copolymer or the thermoplastic resin composition of this invention composed of the thermoplastic resin and other polymer resin is excellent in the balance of physical properties.

In particular, the thermoplastic resin or the thermoplastic resin composition has excellent cold resistance, weather resistance, slidability, abrasion resistance, impact resistance, moldability, weld strength and flame retardant. Of those properties, the slidability and abrasion resistance of the thermoplastic resin or the resin composition are higher than those of polyacetal and polyamide which are known as a sliding materials. Further, other properties of the resin or resin composition are equal or superior to those of an ABS resin which is known to have balanced properties.

Since the thermoplastic resin or the thermoplastic resin composition of this invention has the excellent properties as described above, the resin or the resin composition can be applied to new fields such as sliding parts, parts for cold district, outdoor parts, etc., and the industrial significance thereof is very large.

This invention is described more practically by the following examples. In addition, all percents, parts, ratios and the like are by weight unless otherwise indicated.

Various measurement items in the examples were obtained by the following manners.

That is, the graft ratio and the graft efficiency were determined by the following method.

A definite amount (x) of the graft polymerization product was added to acetone, followed by shaking by a shaker for 2 hours to dissolve the free copolymer, and the mixture was subjected to a centrifugal separation using a centrifugal separator at a rotation rate of 23,000 r.p.m. for 30 minutes to obtain insoluble matters. The insoluble product was dried for 1 hour at 120° C. using a vacuum dryer to provide an amount (y) of the insoluble product, and the graft ratio and the graft efficiency were calculated by the following equations.

$$\text{Graft ratio} = \frac{(y) - (x) \times (Q)}{(x) \times (Q)} \times 100(\%)$$

$$\text{Graft efficiency} = \frac{(y) - (x) \times (Q)}{(x) - (x) \times (Q)} \times 100(\%)$$

(Q): Content of component (III) in the graft polymerization product

Evaluations of the properties of the thermoplastic resin (composition) was made according to the following evaluation method (a) or (b).

| Property | Evaluation Method (a) | | |
|---|---|---|---|
| | Unit | Test Method | Test Condition |
| Tensile Strength | kgf/cm² | ASTM-D638 | Tensile rate 50 mm/min. |
| Bending Strength | kgf/cm² | ASTM-D790 | Bending rate 15 mm/min. |
| Bending Elasticity | kgf/cm² | ASTM-D790 | Bending rate 15 mm/min. |
| Break Elongation | % | ASTM-D638 | Tensile rate 50 mm/min. |
| Izod Impact Strength (notched) | kgf·cm/cm | ASTM-D256 | ¼", 23° C. ¼", −30° C. |
| Heat Distortion Temperature | °C. | ASTM D648 | Load 18.6 kgf/cm² no anneal |
| Specific Gravity | — | ASTM-D792 | 23° C./23° C. |
| Combustibility | — | UL 94 | — |
| Gloss | % | ASTM-D523 | 45° |
| Melt Flow Rate | g/10 min. | JIS-K7210 | 220° C. 10 kg |
| Rockwell Hardness | R Scale | ASTM-D785 | — |

| Property | Evaluation Method (a) | | |
|---|---|---|---|
| | Unit | Test Method | Test Condition |

Evaluation Method (b)

Falling Weight Impact Strength

An impact rod having a top curvature R of ½" was let fall from a height of 50 cm using an impact tester made by Du Pont and the falling weight impact strength of each molded product having a thickness of 3.2 mm was measured. The unit was kgf·cm.

Sliding Character

A friction rubbing test was made using a Suzuki type slide tester, and as a material to be rubbed with the product, the same material as the product of steel (S45C) was used. A test piece was a hollow cylindrical piece having an outer diameter of 25.6 mm and an inner diameter of 20.0 mm, and the form of the material to be rubbed with the test piece was the same as the test piece.

The kinetic friction coefficient was measured in an atmosphere at 23° C. and 50% RH under a load of 5 kg and a running speed of 3.75 cm/sec.

The kinetic friction coefficient was calculated by the following equation.

$$\mu = \frac{3 \times F \times (r_2^2 - r_1^2)}{P \times (r_2^3 - r_1^3)}$$

In the above equation, $\mu$ represents a kinetic friction coefficient, F represents a force given to the load cell, P represents a load, R represents an arm length upto the load cell, $r_1$ represents an inner diameter, and $r_2$ represents an outer diameter.

The friction coefficient was measured in an atmosphere of 23° C. and 50% RH; at a load of 5 kg, a running speed of 3.75 cm/sec., and 12,600 rounds (running distance 0.24 km) in the case of using the same material as the sample as the material to be rubbed with the sample, and at a load of 10 kg, a running speed of 15 cm/sec., and 80,000 rounds (running distance 6 km) in the case of using steel as the material to be rubbed with the sample.

The friction coefficient was calculated by the following equation:

$$A = \frac{\Delta W}{P \times l \times \alpha}$$

wherein A represents a friction coefficient, $\Delta W$ is a weight change of a sample, P is a load, l is a running distance, and $\alpha$ is the density of a sample.

Weather Resistance Test Method

After exposing each sample for 200 hours using a sun shine weather meter (Type WE-USN-HC, made by Toyo Rika K.K.) (exposure conditions: 63° C., sometimes rain), Izod impact strength was measured.

EXAMPLE 1

After mixing 1.5 parts of p-vinylphenylmethyldimethoxysilane and 98.5 parts of octamethylcyclotetrasiloxane, the mixture was added to 300 parts of distilled water having dissolved therein 2.0 parts of dodecylbenzenesulfonic acid and dispersed by emulsification by stirring for 3 minutes using a homomixer.

The mixture was placed in a separable flask equipped with a condenser, a nitrogen gas inlet and a stirrer, and heated to 90° C. for 6 hours with stirring, followed by cooling for 24 hours at 5° C. to complete the condensation.

The degree of condensation of the octamethylcyclotetrasiloxane in the modified polyorganosiloxane (III) obtained was 92.8%.

The modified polyorganosiloxane latex was neutralized to pH 7 with an aqueous sodium carbonate solution.

35 Parts of the modified polyorganosiloxane latex as a solids content was mixed with 0.5 part of sodium dodecylbenzenesulfonate and 140 parts of distilled water, the mixture was placed in a separable flask equipped with a dropping bottle, a condenser, a nitrogen gas inlet and a stirrer. After adding thereto 15.81 parts of styrene corresponding to 34% of the whole styrene amount, 6.29 parts of acrylonitrile corresponding to 34% of the whole acrylonitrile amount, 0.2 part of sodium pyrophosphate, 0.25 part of grape sugar, 0.004 part of ferrous sulfate and 0.074 part of cumene hydroperoxide, the temperature of the resultant mixture was raised to 70° C. while flowing a nitrogen gas. After conducting the polymerization for 1 hour, a mixed liquid composed of 30.69 parts of remaining styrene, 12.21 parts of remaining acrylonitrile, 1.084 parts of sodium dodecylbenzenesulfonate, 42 parts of distilled water, 0.12 part of cumene hydroperoxide, and 0.06 part of t-dodecylmercaptan was added thereto using the dropping bottle over a period of 3 hours. The polymerization reaction was then further conducted for 1 hour and the reaction product was cooled.

The graft copolymer latex thus obtained was poured into warm water having dissolved therein 2 parts of calcium chloride dihydrate to conduct salting out coagulation and a thermoplastic resin containing the graft copolymer was separated. The thermoplastic resin was washed well with water and then dried for 16 hours at 80° C. to finish the purification.

57% of the resulting thermoplastic resin powder was mixed with 43% of a copolymer (AS resin) obtained by emulsion polymerizing styrene and acrylonitrile at a monomer compounding ratio of 75:25 to provide a thermoplastic resin composition. The thermoplastic resin composition was extrusion-molded using a twin screw extruder at a cylinder temperature of 230° C. to provide pellets.

The thermoplastic resin composition obtained had excellent cold resistance, weather resistance, sliding property, impact resistance, and appearance. The evaluation results thereof are shown in Table 1 below.

EXAMPLES 2 AND 3 AND COMPARISON EXAMPLES 1 AND 2

By following the same procedure as in Example 1 except that the compounding ratio of the polyorganosiloxane (I) and the graft crosslinking agent (II) was changed as shown in Table 1 below, the modified polyorganosiloxane latex and the thermoplastic resin containing the graft copolymer were prepared. Using the thermoplastic resin, a thermoplastic resin composition was prepared by the same manner as in Example 1.

The evaluation results on these samples are also shown in Table 1.

In Comparison Example 1, the amount of the graft crosslinking agent was 0.1%. Therefore, the graft ratio was reduced and a sufficient impact strength was not obtained. In Comparison Example 2, the amount of the graft crosslinking agent was 15%. Therefore, the molecular weight of the vinyl monomer grafted to the modified polyorganosiloxane and the vinyl monomer not grafted was reduced and a sufficient impact strength was not obtained.

COMPARISON EXAMPLES 3 TO 5

By following the same procedure as in Example 1 except that 1.5 parts of vinylmethyldimethoxysilane, γ-mercaptopropylmethyldimethoxysilane or γ-methacryloxy-propylmethyldimethoxysilane was used in place of p-vinylphenylmethyldimethoxysilane at the preparation of the modified polyorganosiloxane (III), a modified polyorganosiloxane latex, a thermoplastic resin containing a graft copolymer (V) and a thermoplastic resin composition were prepared.

Results of the evaluation on these thermoplastic resins in the same manner as in Example 1 are shown in Table 1 below.

In Comparison Examples 3 and 4, a high graft ratio was not obtained and a sufficient impact strength was not obtained.

In Comparison Example 5, almost the same impact strength as the product in Example 1 was obtained, but the appearance was poor and sufficient gloss was not obtained.

EXAMPLES 4 TO 6

By following the same procedure as Example 1 except that the vinyl monomer (IV) grafted to the modified polyorganosiloxane (III) was changed as shown in Table 1 below and the resin blended with a thermoplastic resin obtained was changed as shown in Table 1, each thermoplastic resin composition was prepared. The evaluation results of these resin compositions are shown in Table 1.

As is clear from the results shown in Table 1, the graft copolymers (V) had a high graft ratio and thermoplastic resin compositions having a high impact strength and good appearance were obtained.

EXAMPLES 7 AND 8

By following the same procedure as Example 1 except that the graft crosslinking agent was changed as shown in Table 1, each thermoplastic resin and thermoplastic resin composition were prepared and evaluated. The results are shown in Table 1.

As is clear from Table 1, the graft copolymers (V) had a high graft ratio and thermoplastic resin compositions having a high impact strength and a good appearance were obtained.

TABLE 1

| | Example 1 | Example 2 | Example 3 | Example 4 | Example 5 | Example 6 | Example 7 | Example 8 |
|---|---|---|---|---|---|---|---|---|
| Blending Composition (part) at Preparation of Component (III) | | | | | | | | |
| Component (I) | 98.5 | 99.25 | 97.0 | 98.5 | 98.5 | 98.5 | 98.5 | 98.5 |

TABLE 1-continued

|  | | | | | | | | |
|---|---|---|---|---|---|---|---|---|
| Octamethylcyclotetrasiloxane Component (II) | | | | | | | | |
| p-Vinylphenylmethyldimethoxysilane | 1.5 | 0.75 | 3.0 | 1.5 | 1.5 | 1.5 | — | — |
| 2-(p-vinylphenyl)ethylmethyldimethoxysilane | — | — | — | — | — | — | 1.5 | — |
| 3-(p-Vinylbenzoyloxy)propylmethyldimethoxysilane | — | — | — | — | — | — | — | 1.5 |
| Vinylmethyldimethoxysilane | — | — | — | — | — | — | — | — |
| γ-Mercaptopropylmethyldimethoxysilane | — | — | — | — | — | — | — | — |
| γ-Methacryloxypropylmethyldimethoxysilane | — | — | — | — | — | — | — | — |
| Blending Composition (part) at Preparation of Component (IV) | | | | | | | | |
| Component (III) Latex (solid conversion) | 35 | 35 | 35 | 35 | 35 | 35 | 35 | 35 |
| Styrene | 46.5 | 46.5 | 46.5 | 65 | — | 45.5 | 46.5 | 46.5 |
| Acrylonitrile | 18.5 | 18.5 | 18.5 | — | — | — | 18.5 | 18.5 |
| Methyl Methacrylate | — | — | — | — | 65 | 19.5 | — | — |
| Composition (%) of Thermoplastic Resin Composition | | | | | | | | |
| Thermoplastic Resin of the Invention | 57 | 57 | 57 | 57 | 57 | 57 | 57 | 57 |
| AS Resin [ST/AN = 75/25 (%)] | 43 | 43 | 43 | — | — | — | 43 | 43 |
| Polystyrene Resin | — | — | — | 43 | — | — | — | — |
| Polymethylmethacrylate Resin | — | — | — | — | 43 | — | — | — |
| Styrene/MMA Copolymer Resin [ST/MMA = 70/30 (%)] | — | — | — | — | — | 43 | — | — |
| Evaluation | | | | | | | | |
| Graft ratio (%) of Component (V) | 101 | 96 | 117 | 112 | 137 | 125 | 100 | 99 |
| Graft Efficiency (%) of Component (V) | 54 | 51 | 63 | 60 | 74 | 67 | 54 | 53 |
| Property of Thermoplastic Resin Composition: | | | | | | | | |
| Izod Impact Strength (23° C., kgf · cm/cm) | 32.3 | 23.0 | 31.5 | 23.1 | 20.1 | 21.1 | 32.2 | 32.1 |
| Gloss (%) | 85 | 81 | 83 | 77 | 78 | 77 | 81 | 82 |

|  | Comparison Example 1 | Comparison Example 2 | Comparison Example 3 | Comparison Example 4 | Comparison Example 5 |
|---|---|---|---|---|---|
| Blending Composition (part) at Preparation of Component (III) | | | | | |
| Component (I) Octamethylcyclotetrasiloxane | 99.9 | 85 | 98.5 | 98.5 | 98.5 |
| Component (II) | | | | | |
| p-Vinylphenylmethyldimethoxysilane | 0.1 | 15 | — | — | — |
| 2-(p-vinylphenyl)ethylmethyldimethoxysilane | — | — | — | — | — |
| 3-(p-Vinylbenzoyloxy)propylmethyldimethoxysilane | — | — | — | — | — |
| Vinylmethyldimethoxysilane | — | — | 1.5 | — | — |
| γ-Mercaptopropylmethyldimethoxysilane | — | — | — | 1.5 | — |
| γ-Methacryloxypropylmethyldimethoxysilane | — | — | — | — | 1.5 |
| Blending Compositon (part) at Preparation of Component (IV) | | | | | |
| Component (III) Latex (solid conversion) | 35 | 35 | 35 | 35 | 35 |
| Styrene | 46.5 | 46.5 | 46.5 | 46.5 | 46.5 |
| Acrylonitrile | 18.5 | 18.5 | 18.5 | 18.5 | 18.5 |
| Methyl Methacrylate | — | — | — | — | — |
| Composition (%) of Thermoplastic Resin Composition | | | | | |
| Thermoplastic Resin of the Invention | 57 | 57 | 57 | 57 | 57 |
| AS Resin [ST/AN = 75/25 (%)] | 43 | 43 | 43 | 43 | 43 |
| Polystyrene Resin | — | — | — | — | — |
| Polymethylmethacrylate Resin | — | — | — | — | — |
| Styrene/MMA Copolymer Resin [ST/MMA = 70/30 (%)] | — | — | — | — | — |
| Evaluation | | | | | |
| Graft ratio (%) of Component (V) | 15 | 130 | 25 | 17 | 100 |
| Graft Efficiency (%) of Component (V) | 8 | 70 | 13 | 9 | 53 |
| Property of Thermoplastic Resin Composition: | | | | | |
| Izod Impact Strength (23° C., kgf · cm/cm) | 3.0 | 5.0 | 4.0 | 5.7 | 25.0 |
| Gloss (%) | 31.0 | 79.0 | 43 | 48 | 84 |

For examining the differences between the product in Example 1 and the product in Comparison Example 5, the following comparison tests were prepared.

(1) The change of the graft ratio in the case of molding each product under the temperature condition shown in Table 2 is shown in Table 2 below.

In Example 1, the graft ratio at the end of the polymerization is almost the same as the graft ratio after molding at 280° C., which shows the graft point is thermally stable.

On the other hand, in Comparison Example 5, the graft ratio at the end of the polymerization is reduced when the product is molded at 230° C., which shows that the graft point is thermally unstable.

TABLE 2

|  | End of Polymerization | 230° C. | 260° C. | 280° C. | 300° C. |
|---|---|---|---|---|---|
| Graft Ratio in Example 1 | 101 | 100 | 100 | 99 | 92 |
| Graft Ratio in Comparison | 100 | 96 | 85 | 76 | 66 |

TABLE 2-continued

| | End of Polymerization | 230° C. | 260° C. | 280° C. | 300° C. |
|---|---|---|---|---|---|
| Example 5 | | | | | |

In Table 2, the temperature is molding temperature.

(2) The falling weight impact strength in the case of molding each product under the temperature condition shown in Table 3 is shown in Table 3 below.

It is considered that the reduction of the graft ratio clarified in above Test (1) gives an influence on the falling weight impact strength.

In Example 1, the reduction of the strength is small in molding at 280° C., while in Comparison Example 5, the strength is greatly reduced in molding at 280° C. or higher as compared with molding at 260° C.

TABLE 3

| | 260° C. Molding | 280° C. Molding | 300° C. Molding |
|---|---|---|---|
| Falling Weight Impact Strength in Example 1 | 330 | 320 | 250 |
| Falling Weight Impact Strength in Comparison Example 5 | 325 | 260 | 100 |

(3) For observing the retention heat stability in a molding machine, the reduction of gloss from the 1st shot to the 5th shot and the recovering property thereof in continuous molding in the case of conducting injection molding by repeating at a cycle of 60 seconds and in the case of once stopping the molding machine and after retaining the product therein for 15 minutes, conducting injection molding at a cycle of 60 seconds were examined.

The evaluation is made at a molding temperature of 260° C. and 280° C.

The results are showing in Table 4 below.

In Example 1, the change of gloss is small and the recovering property thereof is good. On the other hand, in Comparison Example 5, the change of gloss is observed at a molding temperature of 260° C. and when molding is conducted at 280° C., the gloss is extremely reduced.

TABLE 4

| | Molding temperature (°C.) | Continuous molding | 1st shot* | 2nd shot | 3rd shot | 4th shot | 5th shot |
|---|---|---|---|---|---|---|---|
| Example 1 | 260 | 84.0 | 83.5 | 83.0 | 81.0 | 82.5 | 84.0 |
| | 280 | 83.5 | 81.0 | 80.5 | 76.5 | 79.5 | 81.5 |
| Comparison Example 5 | 260 | 84.0 | 80.0 | 80.0 | 75.0 | 77.0 | 81.0 |
| | 280 | 82.0 | 66.5 | 63.0 | 55.0 | 66.0 | 76.0 |

*After retention of 5 minutes

EXAMPLE 9 AND COMPARISON EXAMPLE 6

In Example 9, a thermoplastic resin composition composed of 51% of the thermoplastic resin obtained in Example 1 and 49% of the AS resin as used in Example 1 was molded by the same method as in Example 1.

The content of the modified polyorganosiloxane (III) in the thermoplastic resin composition of Example 9 was 17.85%.

On the other hand, the resin in Comparison Example 6 was an ABS resin (JSR ABS12, trade name, made by Japan Synthetic Rubber Co., Ltd.) and the content of butadiene rubber in the resin was 17.8%.

On these resins, the properties were compared according to the evaluation methods (a) and (b). The results obtained are shown in Table 5 below.

It can be seen that the thermoplastic resin of this invention has particularly excellent cold resistance, weather resistance and sliding property as compared with the commercially available ABS resin, and also other properties of the thermoplastic resin of this invention are same as or higher than those of the ABS resin.

Furthermore, 100 parts of each of the resins in Example 9 and Comparison Example 6 was blended with 10 parts of tetrabromobisphenol A, 3 parts of antimony trioxide and 0.001 part of chloroplatinic acid, and a flame retardant test was made on each blend according to UL-94.

The results are shown in Table 5 below.

It can be seen that the thermoplastic resin of this invention shows an excellent flame retardance by the addition of a small amount of flame retarder, which gives the merits of inhibiting the reduction of general properties, reducing the toxicity, and also reducing the volume cost, and hence an excellent flame retardant resin is obtained.

TABLE 5

| | Example 9 | Comparison Example 6 |
|---|---|---|
| Izod Impact Strength (23° C.) | 32.3 | 37.2 |
| Falling Weight Impact Strength | 338 | 430 |
| Heat Distortion Temperature | 95 | 91 |
| Rockwell Hardness | 102.1 | 106.0 |
| Melt Flow Rate | 4.2 | 13.5 |
| Tensile Strength | 430 | 490 |
| Break Elongation | 34 | 36 |
| Bending Strength | 720 | 790 |
| Bending Elasticity | 24,500 | 26,700 |
| Gloss | 81 | 78 |
| Izod Impact Strength (−30° C.) | 14.1 | 11.5 |
| Izod Impact Strength After Weather Resistance Test | 28.8 | 25.1 |
| Kinetic Friction Coefficient with the Same Material as the Test Sample | 0.09 | 0.29 |
| Kinetic Friction Coefficient with Steel | 0.09 | 0.46 |
| Wear Coefficient with the Same Material as the Test Sample | $16 \times 10^{-3}$ | $498 \times 10^{-3}$ |
| Wear Coefficient with Steel | $19 \times 10^{-3}$ | $621 \times 10^{-3}$ |
| Combustibility | HB passed | HB passed |
| Specific Gravity | 1.055 | 1.021 |
| Flame Retardability | | |
| HB Test | passed | passed |
| V-2 Test | passed | Failed |
| V-1 Test | passed | Failed |
| V-0 Test | passed | Failed |

EXAMPLES 10 AND 11

In these examples, the thermoplastic resins were molded without blending with other resin, and evaluated. The polymerization condition, the molding condition and the evaluation condition were same as those in Example 1. The results are shown in Table 6.

TABLE 6

|  | Example 10 | Example 11 |
| --- | --- | --- |
| Blending Composition (part) at Preparation of Component (III) | | |
| Octamethylcyclotetrasiloxane | 98.5 | 98.5 |
| p-Vinylphenylmethyldimethoxysilane | 1.5 | 1.5 |
| Blending Composition (part) at Preparation of Component (IV) | | |
| Latex of Component (III) (solids content) | 20 | 20 |
| Styrene | 60 | — |
| Acrylonitrile | 20 | — |
| Methyl Methacrylate | — | 100 |
| Evaluation | | |
| Graft ratio (%) of Component (IV) | 140 | 120 |
| Graft Efficiency (%) of Component (IV) | 35 | 30 |
| Property of Thermoplastic Resin: | | |
| Izod Impact Strength (23° C., kgf·cm/cm) | 28.0 | 19.6 |
| Gloss | 80 | 82 |

EXAMPLE 12

After mixing 20 parts (solids content) of the modified polyorganosiloxane latex obtained in Example 1, 0.5 part of sodium dodecylbenzenesulfonate and 140 parts of distilled water, the mixture was placed in a separable flask equipped with a condenser, a nitrogen gas inlet and a stirrer. After adding thereto 34 parts of styrene, 46 parts of N-phenylmaleimide, 0.1 part of sodium ethylenediaminetetraacetate, 0.003 part of ferrous sulfate and 0.1 part of diisopropyl benzene hydroperoxide, the temperature of the resultant mixture was raised to 70° C. while flowing a nitrogen gas, followed by conducting polymerization for 1 hour. Thereafter, the reaction mixture was cooled.

2 Parts of the graft copolymer latex thus obtained was added to pressurized warm water at 130° C. having dissolved therein calcium chloride dihydrate to conduct salting out and coagulation, and a thermoplastic resin containing the graft copolymer was separated.

The thermoplastic resin was washed well with water and then dried at 80° C. for 16 hours for the purification, and the product was molded into pellets by an extruder having a cylinder temperature of 280° C.

The graft ratio of the thermoplastic resin obtained was 120%, and the thermoplastic resin had a heat distortion temperature of 160° C., an Izod impact strength of 8 kgf·cm/cm and a melt flow rate at 280° C. of 10 g/10 min.

EXAMPLE 13

After mixing 1.5 parts of p-vinylphenyldimethoxysilane and 98.5 parts of octamethylcyclotetrasiloxane, the mixture was added to 300 parts of distilled water having dissolved therein 2.0 parts of dodecylbenzene sulfonate. After roughly emulsifying the mixture by stirring for 5 minutes using a homomixer, 3.0 parts of a 50% methanol solution of 4-(3-triethoxysilylpropoxy)-2-hydroxybenzophenone was added hereto, followed by stirring for 5 minutes. The mixture was then dispersed by emulsification using a press homogenizer.

The mixture was placed in a separable flask equipped with a condenser, a nitrogen gas inlet and a stirrer, heated to 85° C. for 5 hours with stirring, and then allowed to stand for 12 hours at room temperature to complete the polycondensation.

The product was neutralized to pH 7 with a 10% aqueous solution of sodium carbonate. The degree of condensation of octamethylcyclotetrasiloxane in the modified polyorganosiloxane was 92.3%, the average degree of polymerization of the product was 5,200 as a silicon atom number, the content of the p-vinylphenyl group in the organic groups in the polymer was 0.27%, and the content of the UV absorbing group was 0.13%.

Using the modified polyorganosiloxane latex thus obtained, styrene and acrylonitrile were graft polymerized thereto by the same manner as in Example 1.

A thermoplastic resin composition was prepared by blending the polysiloxane-modified thermoplastic resin obtained by the above method with other organic polymer.

That is, the resin composition was prepared by mixing 57% of the powder of the polyorganosiloxane-modified thermoplastic resin obtained and 43% of a copolymer (AS resin) obtained by emulsion polymerizing stryene and acrylonitrile in a monomer blending ratio of 75:25 by weight ratio. The combination of the above components is shown in Table 7 below.

The thermoplastic resin composition was extruded into pellets using a twin screw extruder at a cylinder temperature of 230° C.

On the thermoplastic resin composition thus obtained, the impact resistance, sliding property, weather resistance and gloss were measured.

In addition, the weather resistance test was conducted as follows. That is, after exposing the sample for 1500 hours (83° C., no rain) using a sun shine weather meter (Type WE-USN-HC, made by Toyo Rika K.K.), the discolored degree Lab (L: brightness, a: redness, b: yellowness) was measured by a colorimeter of Type AU-SCH-2, made by Suga Shikenki K.K., and the tone changed value E was calculated by the following equation.

$$E = \sqrt{(L_1 - L_2)^2 + (a_1 - a_2)^2 + (b_1 - b_1 - b_2)^2}$$

wherein $L_1$, $a_1$ and $b_1$ are tone before the weather resistance test, and $L_2$, $a_2$ and $b_2$ are tone after the weather resistance test.

In the above equation the lower value of E shows that the change of color is small, that is, the resin composition has excellent weather resistance.

EXAMPLE 14

By following the same procedure as in Example 13 except that 1.5 parts of γ-methacryloxypropylmethyldimethoxysilane was used in place of p-vinylphenylmethyldimethoxysilane and 3.0 parts of a 50% methanol solution of 4-(3-methyldiethoxysilylpropoxy)-2-hydroxybenzophenone was used in place of the 50% methanol solution of 4-(3-triethoxysilylpropoxy)-2-hydroxybenzophenone, a polyorganosiloxane-modified thermoplastic resin was prepared.

The average degree of polymerization of polyorganosiloxane was 3,900 as a silicon atom number, the content of the reactive unsaturated group in the organic groups of the polymer was 0.24%, and the content of the UV absorbing group was 0.15%.

Furthermore, a thermoplastic resin composition was prepared by blending the polyorganosiloxane-modified thermoplastic resin and the AS resin under the same condition as in Example 13. The combination of the above components is shown in Table 7 below.

On the thermoplastic resin composition thus obtained, the impact resistance, sliding property, weather resistance and gloss were measured in the same manner as in Example 13.

The results are shown in Table 7 below.

EXAMPLE 15

By following the same procedure as in Example 13 except that 1.0 part of methylvinyldimethoxysilane was used in place of p-vinylphenylmethyldimethoxysilane and 2.0 parts of laurylsulfuric acid was used in place of dodecylbenzenesulfonic acid, a polyorganosiloxane-modified thermoplastic resin was prepared.

The average degree of polymerization of the polyorganosiloxane was 5,400 as a silicon atom number, the content of the reactive unsaturated group in the organic groups in the polymer was 0.28%, and the content of the UV absorbing group was 0.14%.

Furthermore, a thermoplastic resin composition was prepared by blending the polyorganosiloxane-modified thermoplastic resin and the AS resin under the same condition as in Example 13.

On the thermoplastic resin composition obtained, the impact resistance, sliding property, weather resistance and gloss were measured. The results are shown in Table 7 below.

EXAMPLES 16 to 18 AND REFERENCE EXAMPLE 1

The same procedure as Example 13 was followed using the components shown in Table 7 below. The evaluation results of these products are shown in Table 7.

It can be seen from the results shown in Table 7 that the thermoplastic resin composition containing the graft copolymer having the UV absorbing group has excellent weather resistance.

TABLE 7

|  | Example 13 | Example 14 | Example 15 | Example 16 | Example 17 | Example 18 | Reference Example 1 |
|---|---|---|---|---|---|---|---|
| Polyorganosiloxane-Modified Thermoplastic Resin: | | | | | | | |
| Component (A) (part) | | | | | | | |
| (a) Octamethylcyclotetrsiloxane | 98.5 | 98.5 | 98.5 | 98.5 | 98.5 | 98.5 | 98.5 |
| (b) p-Vinylphenylmethyldimethoxysilane | 1.5 | | | 1.5 | 1.5 | 1.5 | 1.5 |
| γ-Methacryloxypropylmethyldimethoxysilane | | 1.5 | | | | | |
| Methylvinyldimethoxysilane | | | 1.5 | | | | |
| (c) 50% Methanol Solution of 4-(3-triethoxysilylpropoxy)-2-hydroxybenzophenone | 3.0 | | 3.0 | 3.0 | 3.0 | 3.0 | |
| 50% Methanol Solution of 4-(3-methyldiethoxysilylpropoxy)-2-hydroxybenzophenone | | 3.0 | | | | | |
| Component (B) (part) | | | | | | | |
| Blending Composition for Graft Copolymer | | | | | | | |
| Polyorganosiloxane of Component (A) | 35 | 35 | 35 | 35 | 35 | 35 | 35 |
| Styrene | 46.5 | 46.5 | 46.5 | 65 | | 45.5 | 46.5 |
| Acrylonitrile | 18.5 | 18.5 | 18.5 | | | | 18.5 |
| Methyl Methacrylate | | | | | 65 | 19.5 | |
| Thermoplastic Resin Composition and Evaluation Thereof: | | | | | | | |
| Composition (%) | | | | | | | |
| Blend Resin: | | | | | | | |
| Polyorganosiloxane-modified Thermoplastic Resin | 57 | 57 | 57 | 57 | 57 | 57 | 57 |
| AS Resin | 43 | 43 | 43 | | | | 43 |
| Polystyrene Resin | | | | 43 | | | |
| Polymethyl Methacrylate Resin | | | | | 43 | | |
| Styrene/MMA Copolymer Resin | | | | | | 43 | |
| Evaluation: | | | | | | | |
| Graft Ratio (%) of Graft Copolymer | 101 | 99 | 53 | 100 | 97 | 100 | 102 |
| Graft Efficiency (%) of Graft Copolymer | 54 | 53 | 29 | 54 | 52 | 54 | 55 |
| Izod Impact Strength | | | | | | | |
| (23° C.) | 32 | 31 | 20 | 19 | 16 | 23 | 32 |
| (−30° C.) | 14 | 13 | 9 | 9 | 8 | 10 | 14 |
| Kinetic Friction Coefficient with the same Material as the Sample | 0.09 | 0.09 | 0.09 | 0.09 | 0.09 | 0.09 | 0.09 |
| Relative Worn Amount with the same Material (× $10^{-3}$) | 16 | 16 | 16 | 16 | 16 | 16 | 16 |
| Izod Impact Strength After Weather Resistance Test (kgf · cm/cm) | 29 | 28 | 17 | 16 | 13 | 20 | 29 |
| Appearance Change After Weather Resistance Test (ΔE) | 3.1 | 3.2 | 3.1 | 4.5 | 2.6 | 1.5 | 10.8 |
| Gloss (%) | 85 | 84 | 72 | 82 | 83 | 85 | 85 |

EXAMPLES 19 TO 34 AND COMPARISON EXAMPLES 7 TO 9

By following the same procedure as Example 13 using the components shown in Table 8 below, each of polyorganosiloxane series polymers R-1, R-2, and R-3 were prepared.

TABLE 8

|  | R-1 | R-2 | R-3 |
|---|---|---|---|
| p-Vinylphenylmethyldimethoxysilane (part) | 1.5 | 0.05 | 55 |
| Octamethylcyclotetrasiloxane (part) | 98.5 | 99.95 | 45 |

TABLE 8-continued

|  | R-1 | R-2 | R-3 |
|---|---|---|---|
| Polymerization Conversion (%) | 98.0 | 97.5 | 98.5 |

By following the same procedure as in Example 13 according to the compositions shown in Table 9 below using the polyorganosiloxane series polymers prepared in the above step, graft copolymers G-1 to G-8 were prepared.

TABLE 9

| Polymer: | G-1 | G-2 | G-3 | G-4 | G-5 | G-6 | G-7 | G-8 |
|---|---|---|---|---|---|---|---|---|
| Batch Blending Composition (part) | | | | | | | | |
| Polyorganosiloxane Series Polymer | | | | | | | | |
| R-1 | 60 | — | — | 60 | 60 | 60 | 60 | 60 |
| R-2 | — | 60 | — | — | — | — | — | — |
| R-3 | — | — | 60 | — | — | — | — | — |
| Styrene | 15 | 15 | 15 | — | — | 10 | 15 | 15 |
| α-Methylstyrene | — | — | — | 15 | — | — | — | — |
| Methyl Methacrylate | — | — | — | — | 15 | — | — | — |
| Acrylonitrile | — | — | — | — | — | 2 | — | — |
| Glycidyl Acrylate | — | — | — | — | — | — | 2 | — |
| Glycidyl Methacrylate | 2 | 2 | 2 | 2 | 2 | 2 | — | — |
| Blending Composition (part) | | | | | | | | |
| Styrene | 20 | 20 | 20 | — | — | 20 | 20 | 20 |
| α-Methylstyrene | — | — | — | 20 | — | — | — | — |
| Methyl Methacrylate | — | — | — | — | 20 | — | — | — |
| Acrylonitrile | — | — | — | — | — | 3 | — | — |
| Glycidyl Acrylate | — | — | — | — | — | — | 3 | — |
| Glycidyl Methacrylate | 3 | 3 | 3 | 3 | 3 | 3 | — | — |
| Polymerization Conversion (%) | 97 | 96 | 98 | 97 | 96 | 97 | 97 | 98 |
| Polymer Composition (%) | | | | | | | | |
| Polyorganosiloxane Series Polymer | 60 | 60 | 60 | 60 | 60 | 60 | 60 | 60 |
| Styrene | 35 | 35 | 35 | — | — | 30 | 35 | 40 |
| α-Methylstyrene | — | — | — | 35 | — | — | — | — |
| Methyl Methacrylate | — | — | — | — | 35 | — | — | — |
| Acrylonitrile | — | — | — | — | — | 5 | — | — |
| Glycidyl Acrylate | — | — | — | — | — | — | 5 | — |
| Glycidyl Methacrylate | 5 | 5 | 5 | 5 | 5 | 5 | — | — |
| Graft ratio (%) | 30 | 5 | 35 | 28 | 25 | 30 | 29 | 31 |

Each composition shown in Table 9 below was melt-kneaded by an extruder having an inner diameter of 40 mm at a temperature range of from 280° to 320° C. to provide pellets.

The pellets were molded using a 5 oz injection molding machine (1S-80A, made by Toshiba Corporation) at the temperature range of from 280° to 320° C. to provide each test piece, and the properties of each sample were evaluated. The results are shown in Table 9 below.

In addition, the heat distortion temperature was measured under conditions of a load of 18.6 kgf/cm$^2$ and no anneal according to ASTM D648.

The chemical resistance was evaluated by applying a definite strain of 1% in strain ratio to each test piece (150 "×½"×5"), coating a brake fluid composed of dioctyl phthalate (DOP) on the strained portion, and after allowing to stand the test piece at 23° C. and measuring the time until the test piece was ruptured, the time was employed as the index of the chemical resistance.

In the above evaluation, ○ shows the case of causing neither crack nor rupture over 100 hours.

The weld strength retentivity was obtained as follows.

That is, the tensile strength (Tw) of the test piece was measured on the molded test piece using a mold appearing a weld line at the center of ASTM No. 1 Dumbbell, the tensile strength (To) of the test piece was measured on the test piece molded using a mold of not giving the weld line, and the weld strength retensitivity of Tw/To×100% was determined.

The molding property was evaluated by the presence or absence of the occurence of gellation or the rupture of moldings in the step of granulating the product by an extruding machine and obtaining the moldings by a molding machine.

The appearance of the moldings was evaluated by the presence or absence of the occurence of a flow mark silver on the surface of the moldings.

In addition, in the examples and the comparison examples, the following materials were used as the composition (A).

PPS (polyphenylene sulfide series resin): Toprene T-4, made by Toprene K.K.

Nylon 6: Amilan CM 1017, made by Toray Industries, Co., Ltd.

Nylon 4,6: Stanyl KS300, made by DSM Co.

PBT (polybutylene terephthalate): Duranex XD499 made by Polyplastic Co.

PC (polycarbonate): A-2200, made by Idemitsu Sekiyu-Kagaku K.K.)

PVC (polyvinyl chloride): Aron TS700, made by Toagosei Chemical Industry Co., Ltd.)

MPP (maleic anhydride-modified polypropylene), MODIC P-10B, made by Mitsubishi Peterochemical Comapany, Ltd.

POM (polyoxymethylene): Duracon M90, made by Polyplastic K.K.

Polyarylate: U Polymer U-8000, made by Unitika Ltd.

PPE (polyphenylene ether) was prepared by the following method.

(1) Production of PPE-1 (polyphenylene ether)

Polymerization reaction of 2,6-xylenol was carried out in a toluene solution while blowing oxygen into the solution at 30° C. using cupric bromide and di-n-butyleneamine as a catalyst and the polymerized product was purified to provide PPE-1.

[η] of the polymer PPE-1 measured at 30° C. using chloroform as solvent was 0.40 dl/g.

(2) Production of PPE-2 (maleic anhydride modified polyphenylene ether)

After dry-blending 100 parts by weight of the polymer PPE-1 with 2 parts of maleic anhydride and 1 part of 2,5-dimethyl-2,5-di(t-butyleneperoxy)hexane at room temperature, the blend was melt-kneaded using a same direction rotary system twin screw extruder equipped with vent at a cylinder temperature of 300° C. and a screw rotation number of 150 r.p.m. to form pellets of the polymer, i.e., maleic anhydride-modified polypheneylene ether (PPE-2).

TABLE 10-A

|  | Example 19 | Example 20 | Example 21 | Example 22 | Example 23 | Example 24 |
|---|---|---|---|---|---|---|
| Blending Composition (part) of Composition: |  |  |  |  |  |  |
| Component (A) PPS | 70 | 70 | 70 | 70 | 70 | 70 |
| Component (B) |  |  |  |  |  |  |
| G-1 | 30 | — | — | — | — | 30 |
| G-2 | — | — | — | — | — | — |
| G-3 | — | — | — | — | — | — |
| G-4 | — | 30 | — | — | — | — |
| G-5 | — | — | 30 | — | — | — |
| G-6 | — | — | — | 30 | — | — |
| G-7 | — | — | — | — | 30 | — |
| G-8 | — | — | — | — | — | — |
| Glass Fibers | — | — | — | — | — | 30 |
| Amount (%) of Polyorganosiloxane in Composition | 18 | 18 | 18 | 18 | 18 | 18 |
| Amount (%) of Epoxy Group-Having Vinyl Monomer in Composition | 1.5 | 1.5 | 1.5 | 1.5 | 1.5 | 1.5 |
| Evaluation Result: |  |  |  |  |  |  |
| Izod Impact Strength (23° C.) (kgf·cm/cm) | 10 | 9 | 10 | 14 | 10 | 6 |
| MFR (g/10 min., 300° C.) | 36 | 34 | 37 | 37 | 36 | 25 |
| Chemical Resistance: |  |  |  |  |  |  |
| DOP | ○ | ○ | ○ | ○ | ○ | ○ |
| Brake Fluid | ○ | ○ | ○ | ○ | ○ | ○ |
| Gloss (%) | 78 | 75 | 80 | 80 | 78 | 51 |
| Weld Strength Retentivity (%) | 92 | 90 | 92 | 93 | 92 | 75 |
| Heat Distortion Temperature (°C.) | 99 | 103 | 100 | 99 | 99 | 250 |
| Kinetic Friction Coefficient (with same material) | 0.09 | 0.09 | 0.09 | 0.09 | 0.09 | 0.09 |
| Relative Worn Amount (with same material) | $16 \times 10^{-3}$ | $16 \times 10^{-3}$ | $16 \times 10^{-3}$ | $16 \times 10^{-3}$ | $16 \times 10^{-3}$ | $16 \times 10^{-3}$ |
| Izod Impact Strength After Weather Resistance Test (kgf·cm/cm) | 9 | 8 | 9 | 13 | 9 | 6 |
| Moldability | good | good | good | good | good | good |
| Appearance of Moldings | good | good | good | good | good | good |

|  | Comparison Example 7 | Comparison Example 8 | Reference Example 2 | Reference Example 3 | Reference Example 4 | Comparison Example 9 |
|---|---|---|---|---|---|---|
| Blending Composition (part) of Composition: |  |  |  |  |  |  |
| Component (A) PPS | 70 | 70 | 70 | 95 | 5 | 100 |
| Component (B) |  |  |  |  |  |  |
| G-1 | — | — | — | 5 | 95 | — |
| G-2 | 30 | — | — | — | — | — |
| G-3 | — | 30 | — | — | — | — |
| G-4 | — | — | — | — | — | — |
| G-5 | — | — | — | — | — | — |
| G-6 | — | — | — | — | — | — |
| G-7 | — | — | — | — | — | — |
| G-8 | — | — | 30 | — | — | — |
| Glass Fibers | — | — | — | — | — | — |
| Amount (%) of Polyorganosiloxane in Composition | 18 | 18 | 18 | 3 | 57 | — |
| Amount (%) of Epoxy Group-Having Vinyl Monomer in Composition | 1.5 | 1.5 | — | 0.25 | 4.75 | — |
| Evaluation Result: |  |  |  |  |  |  |
| Izod Impact Strength (23° C.) (kgf·cm/cm) | 3 | 3 | 1 | 2 | 3 | 2 |
| MFR (g/10 min., 300° C.) | 32 | 33 | 34 | 210 | 11 | 258 |
| Chemical Resistance: |  |  |  |  |  |  |
| DOP | ○ | ○ | ○ | ○ | 10 hr. | ○ |
| Brake Fluid | ○ | ○ | ○ | ○ | 8 hr. | ○ |
| Gloss (%) | 70 | 77 | 40 | 74 | 30 | 75 |
| Weld Strength Retentivity (%) | 40 | 42 | 5 | 35 | 80 | 30 |
| Heat Distortion Temperature (°C.) | 98 | 99 | 95 | 105 | 70 | 110 |
| Kinetic Friction Coefficient (with same material) | 0.09 | 0.09 | 0.09 | 0.09 | 0.09 | 0.20 |
| Relative Worn Amount (with same material) | $16 \times 10^{-3}$ | $16 \times 10^{-3}$ | $16 \times 10^{-3}$ | $16 \times 10^{-3}$ | $16 \times 10^{-3}$ | $200 \times 10^{-3}$ |
| Izod Impact Strength After Weather Resistance Test (kgf·cm/cm) | 1 | 1 | 9 | 1 | 2 | 1 |
| Moldability | good | good | no good | good | no good | good |
| Appearance of Moldings | good | good | no good | good | no good | good |

TABLE 10-B

|  | Example 25 | Example 26 | Example 27 | Example 28 | Example 29 |
|---|---|---|---|---|---|
| Blending Composition (part) of Composition: | | | | | |
| Component (A) | | | | | |
| Nylon 6 | 70 | — | — | — | — |
| Nylon 4, 6 | — | 70 | — | — | — |
| PBT | — | — | 70 | — | — |
| PC | — | — | — | 70 | — |
| PVC | — | — | — | — | 70 |
| MPP | — | — | — | — | — |
| POM | — | — | — | — | — |
| Polyarylate | — | — | — | — | — |
| PPE 1 | — | — | — | — | — |
| PPE 2 | — | — | — | — | — |
| Component (B) | 30 | 30 | 30 | 30 | 30 |
| G-1 | | | | | |
| Amount (%) of Polyorganosiloxane in Composition | 18 | 18 | 18 | 18 | 18 |
| Amount (%) of Epoxy Group-Having Vinyl Monomer in Composition | 1.5 | 1.5 | 1.5 | 1.5 | 1.5 |
| Evaluation Result: | | | | | |
| Izod Impact Strength (23° C.) (kgf · cm/cm) | 18 | 15 | 27 | 31 | 18 |
| MFR (g/10 min.) (Temp.) | 36 (240) | 55 (300) | 43 (240) | 25 (240) | 12 (200) |
| Chemical Resistance: | | | | | |
| DOP | | | | 1.0 hr. | 1.2 hr. |
| Brake Fluid | | | | 1.1 hr. | 1.2 hr. |
| Gloss (%) | 87 | 86 | 85 | 88 | 75 |
| Weld Strength Retentivity (%) | 88 | 89 | 92 | 89 | 81 |
| Heat Distortion Temperature (°C.) | 70 | 90 | 80 | 90 | 60 |
| Kinetic Friction Coefficient (with same material) | 0.09 | 0.09 | 0.09 | 0.09 | 0.09 |
| Relative Worn Amount (with same material) | $16 \times 10^{-3}$ | $16 \times 10^{-3}$ | $16 \times 10^{-3}$ | $16 \times 10^{-3}$ | $20 \times 10^{-3}$ |
| Izod Impact Strength After Weather Resistance Test (kgf · cm/cm) | 17 | 14 | 26 | 30 | 17 |
| Moldability | good | good | good | good | good |
| Appearance of Moldings | good | good | good | good | good |

|  | Example 30 | Example 31 | Example 32 | Example 33 | Example 34 |
|---|---|---|---|---|---|
| Blending Composition (part) of Composition: | | | | | |
| Component (A) | | | | | |
| Nylon 6 | — | — | — | — | — |
| Nylon 4, 6 | — | — | — | — | — |
| PBT | — | — | — | — | — |
| PC | — | — | — | — | — |
| PVC | — | — | — | — | — |
| MPP | 70 | — | — | — | — |
| POM | — | 70 | — | — | — |
| Polyarylate | — | — | 70 | — | — |
| PPE 1 | — | — | — | 70 | — |
| PPE 2 | — | — | — | — | 70 |
| Component (B) | 30 | 30 | 30 | 30 | 30 |
| G-1 | | | | | |
| Amount (%) of Polyorganosiloxane in Composition | 18 | 18 | 18 | 18 | 18 |
| Amount (%) of Epoxy Group-Having Vinyl Monomer in Composition | 1.5 | 1.5 | 1.5 | 1.5 | 1.5 |
| Evaluation Result: | | | | | |
| Izod Impact Strength (23° C.) (kgf · cm/cm) | 24 | 18 | 25 | 23 | 30 |
| MFR (g/10 min.) (Temp.) | 33 (220) | 36 (200) | 30 (300) | 34 (260) | 32 (260) |
| Chemical Resistance: | | | | | |
| DOP | | | | | |
| Brake Fluid | | | | | |
| Gloss (%) | 85 | 76 | 75 | 78 | 83 |
| Weld Strength Retentivity (%) | 85 | 82 | 81 | 82 | 85 |
| Heat Distortion Temperature (°C.) | 60 | 80 | 105 | 100 | 100 |
| Kinetic Friction Coefficient (with same material) | 0.09 | 0.09 | 0.09 | 0.09 | 0.09 |
| Relative Worn Amount (with same material) | $18 \times 10^{-3}$ | $13 \times 10^{-3}$ | $16 \times 10^{-3}$ | $16 \times 10^{-3}$ | $16 \times 10^{-3}$ |
| Izod Impact Strength After Weather Resistance Test (kgf · cm/cm) | 23 | 17 | 24 | 22 | 29 |
| Moldability | good | good | good | good | good |
| Appearance of Moldings | good | good | good | good | good |

It can be seen from the results shown in Table 10 that in Examples 19 to 34, thermoplastic resin compositions desired in this invention are obtained. On the other hand, in Comparison Examples 7 to 9, the desired effects of this invention cannot be obtained. That is, in Comparison Examples 7 and 8, the amount of the graft crosslinking agent in each polyorganosiloxane series copolymer is outside the range defined in this invention and as a result, each product is inferior in Izod impact strength.

Reference Example 2 is an example of a composition outside the range of this invention, which was prepared using a graft copolymer without using an epoxy group-containing monomer. The impact strength, gloss, weld strength retentivity, moldability and the appearance of the molding are inferior. Reference Example 3 is an example wherein the graft copolymer is less than the range of this invention and the product is inferior in impact resistance and weld strength retentivity. Reference Example 4 is an example wherein the graft copolymer is over the range defined in this invention and the product is inferior in heat distortion temperature.

Comparison Example 9 shows the properties of PPS (polyphenylene sulfide series resin).

EXAMPLES 35 TO 60

By following the same procedure as in Example 1 using the components shown in Table 11 below, a polyorganosiloxane series copolymer R-1, R-2 and R-3 were obtained.

TABLE 11

|  | R-1 | R-2 | R-3 |
|---|---|---|---|
| p-Vinylphenylmethyldi-methoxysilane (part) | 1.5 | 0.05 | 55 |
| Octamethylcyclotetra-siloxane (part) | 98.5 | 99.95 | 45 |
| Polymerization Conversion (%) | 98.0 | 97.5 | 98.5 |

By following the same procedure as in Example 13 using the above polyorganosiloxane series polymer according to the compositions shown in Tables 12 and 13 below, graft copolymers A-1 to A-8, B-1 to B-8 and C-1 to C-3 shown in Table 12 and Table 13 were obtained.

TABLE 12

| Polymer | A-1 | A-2 | A-3 | A-4 |
|---|---|---|---|---|
| Batch Blending Composition (part) | | | | |
| Polyorganosiloxane Series Polymer R-1 | 40 | 40 | 40 | 40 |
| Styrene | 14.3 | 11.3 | 14.3 | 19.0 |
| Acrylonitrile | 4.7 | 4.3 | 4.7 | — |
| α-Methylstyrene | — | 3.3 | — | — |
| Methacrylic acid | 1 | 1 | — | 1 |
| Acrylic acide | — | — | 1 | — |
| Blending Composition (part) | | | | |
| Styrene | 28.7 | 22.7 | 28.7 | 38.0 |
| Acrylonitrile | 9.3 | 8.7 | 9.3 | — |
| α-Methylstyrene | — | 6.7 | — | — |
| Methacrylic acid | 2 | 2 | — | 2 |
| Acrylic acid | — | — | 2 | — |
| Polymerization (%) | 98.5 | 98.3 | 98.5 | 98.9 |
| Polymer Composition (%) | | | | |
| Polyorganosiloxane Series Polymer | 40 | 40 | 40 | 40 |
| Styrene | 43 | 34 | 43 | 57 |
| Acrylonitrile | 14 | 13 | 14 | — |
| α-Methylstyrene | — | 10 | — | — |
| Methacrylic acid | 3 | 3 | — | 3 |
| Acrylic acid | — | — | 3 | — |
| Graft ratio (%) | 95 | 87 | 94 | 98 |
| Limiting Viscosity [η] (dl/g) | 0.50 | 0.48 | 0.51 | 0.50 |

TABLE 13

| Polymer | B-1 | B-2 | B-3 | C-1 | C-2 | C-3 |
|---|---|---|---|---|---|---|
| Batch Blending Composition (part) | | | | | | |
| Polyorganosiloxane Series Polymer | | | | | | |
| R-1 | 40 | — | 40 | — | — | — |
| R-2 | — | — | — | — | — | — |
| R-3 | — | 40 | — | — | — | — |
| Styrene | 15 | 15 | 12.5 | 75 | 67.5 | 100 |
| Acrylonitrile | 5 | 5 | 4.2 | 25 | 22.5 | — |
| α-Methylstyrene | — | — | 3.3 | — | 10 | — |
| Methacrylic acid | — | — | — | — | — | — |
| Acrylic acid | — | — | — | — | — | — |
| Blending Composition (part) | | | | | | |
| Styrene | 30 | 30 | 25 | — | — | — |
| Acrylonitrile | 10 | 10 | 8.3 | — | — | — |
| α-Methylstyrene | — | — | 6.7 | — | — | — |
| Methacrylic acid | — | — | — | — | — | — |
| Acrylic acid | — | — | — | — | — | — |
| Polymerization (%) | 98.7 | 98.8 | 98.4 | 99.5 | 99.8 | 99.7 |
| Polymer Composition (%) | | | | | | |
| Polyorganosiloxane Series Polymer | 40 | 40 | 40 | — | — | — |
| Styrene | 45 | 45 | 37.5 | 75 | 67.5 | 100 |
| Acrylonitrile | 15 | 15 | 12.5 | 25 | 22.5 | — |
| α-Methylstyrene | — | — | 10 | — | 10 | — |
| Methacrylic acid | — | — | — | — | — | — |
| Graft ratio (%) | 96 | 102 | 88 | — | — | — |
| Limiting Viscosity [η] (dl/g) | 0.51 | 0.21 | 0.47 | 0.60 | 0.55 | 0.51 |

The components (A) to (D) shown below were melt-kneaded by an extruder having an inner diameter of 40 mm at the temperature range of from 250° to 320° C. to provide pellets.

The pellets were molded using a 5 oz injection molding machine (IS-80A, made by Toshiba Corporation at a molding temperature of from 260° to 300° C. to provide each test piece and the properties of the test piece were evaluated. The results are shown in Table 14 below.

In addition, in the above examples and comparison examples, the component (D) used was the same as in Examples 19 to 34 described above.

As is clear from Table 14, in Examples 35 to 60, the desired thermoplastic resin compositions of this invention are obtained.

TABLE 14

| | Example 35 | Example 36 | Example 37 | Example 38 | Example 39 | Example 40 |
|---|---|---|---|---|---|---|
| Blending Composition (part) of Composition: | | | | | | |

TABLE 14-continued

| Component (A) | | | | | | |
|---|---|---|---|---|---|---|
| A-1 | 10 | 10 | 10 | — | — | 30 |
| A-2 | — | — | — | — | 10 | — |
| A-3 | — | — | — | 10 | — | — |
| A-4 | — | — | — | — | — | — |
| Component (B) | | | | | | |
| B-1 | 30 | 40 | 9 | 30 | — | 10 |
| B-2 | — | — | — | — | 30 | — |
| B-3 | — | — | — | — | — | — |
| Component (C) | | | | | | |
| C-1 | 10 | 30 | 1 | 10 | — | 10 |
| C-2 | — | — | — | — | 10 | — |
| C-3 | — | — | — | — | — | — |
| Component (D) | | | | | | |
| Nylon 6 | 50 | 20 | 80 | 50 | 50 | 50 |
| Nylon 4, 6 | — | — | — | — | — | — |
| PBT | — | — | — | — | — | — |
| PC | — | — | — | — | — | — |
| PVC | — | — | — | — | — | — |
| MPP | — | — | — | — | — | — |
| POM | — | — | — | — | — | — |
| PPS | — | — | — | — | — | — |
| Polyarylate | — | — | — | — | — | — |
| PPE 1 | — | — | — | — | — | — |
| PPE 2 | — | — | — | — | — | — |
| Amount (%) of Polyorganosiloxane in Composition | 16 | 20 | 7.6 | 16 | 16 | 16 |
| Amount (%) of carboxyl Group-Having Vinyl Monomer in Composition | 0.3 | 0.3 | 0.3 | 0.3 | 0.3 | 0.9 |
| Evaluation Result: | | | | | | |
| Izod Impact Strength; 23° C. | 18 | 20 | 10 | 17 | 15 | 20 |
| (kgf · cm/cm) −30° C. | 11 | 12 | 6 | 10 | 9 | 12 |
| MFR (g/10 min) (Temp.) | 36 (240) | 20 (240) | 33 (240) | 45 (240) | 41 (240) | 43 (240) |
| Chemical Resistance: | | | | | | |
| DOP | | | | | | |
| Brake Fluid | | | | | | |
| Gloss (%) | 88 | 87 | 85 | 86 | 86 | 88 |
| Weld Strength Retentivity (%) | 88 | 90 | 87 | 92 | 90 | 91 |
| Kinetic Friction Coefficient (with same material) | 0.09 | 0.09 | 0.09 | 0.09 | 0.09 | 0.09 |
| Relative Worn Amount (with same material) | $16 \times 10^{-3}$ | $16 \times 10^{-3}$ | $16 \times 10^{-3}$ | $16 \times 10^{-3}$ | $16 \times 10^{-3}$ | $16 \times 10^{-3}$ |
| Izod Impact Strength After Weather Resistance Test (kgf · cm/cm) | 17 | 19 | 10 | 16 | 14 | 19 |

| | Example 41 | Example 42 | Example 43 | Example 44 | Example 45 | Example 46 | Example 47 |
|---|---|---|---|---|---|---|---|
| Blending Composition (part) of Composition: | | | | | | | |
| Component (A) | | | | | | | |
| A-1 | — | — | — | 10 | 10 | 10 | 10 |
| A-2 | — | — | — | — | — | — | — |
| A-3 | — | — | — | — | — | — | — |
| A-4 | 10 | 10 | 10 | — | — | — | — |
| Component (B) | | | | | | | |
| B-1 | — | — | — | 30 | 40 | 9 | 30 |
| B-2 | — | — | — | — | — | — | — |
| B-3 | 30 | 40 | 9 | — | — | — | — |
| Component (C) | | | | | | | |
| C-1 | — | — | — | 10 | 30 | 1 | 10 |
| C-2 | — | — | — | — | — | — | — |
| C-3 | 10 | 30 | 1 | — | — | — | — |
| Component (D) | | | | | | | |
| Nylon 6 | — | — | — | — | — | — | — |
| Nylon 4, 6 | 50 | 20 | 80 | — | — | — | — |
| PBT | — | — | — | 50 | 20 | 80 | — |
| PC | — | — | — | — | — | — | 50 |
| PVC | — | — | — | — | — | — | — |
| MPP | — | — | — | — | — | — | — |
| POM | — | — | — | — | — | — | — |
| PPS | — | — | — | — | — | — | — |
| Polyarylate | — | — | — | — | — | — | — |
| PPE 1 | — | — | — | — | — | — | — |
| PPE 2 | — | — | — | — | — | — | — |
| Amount (%) of Polyorganosiloxane in Composition | 16 | 20 | 7.6 | 16 | 20 | 7.6 | 16 |
| Amount (%) of carboxyl Group-Having Vinyl Monomer in Composition | 0.3 | 0.3 | 0.3 | 0.3 | 0.3 | 0.3 | 0.3 |
| Evaluation Result: | | | | | | | |
| Izod Impact Strength; 23° C. | 15 | 19 | 11 | 27 | 21 | 26 | 31 |
| (kgf · cm/cm) −30° C. | 9 | 11 | 7 | 16 | 13 | 16 | 19 |
| MFR (g/10 min.) (Temp.) | 55 (300) | 45 (300) | 72 (300) | 43 (240) | 34 (240) | 60 (240) | 25 (240) |

TABLE 14-continued

| Chemical Resistance: | | | | | | | |
|---|---|---|---|---|---|---|---|
| DOP | — | — | — | — | — | — | 1.0 |
| Brake Fluid | — | — | — | — | — | — | 1.1 |
| Gloss (%) | 86 | 87 | 85 | 85 | 87 | 88 | 88 |
| Weld Strength Retentivity (%) | 89 | 90 | 90 | 92 | 90 | 89 | 89 |
| Kinetic Friction Coefficient (with same material) | 0.09 | 0.09 | 0.09 | 0.09 | 0.09 | 0.09 | 0.09 |
| Relative Worn Amount (with same material) | $16 \times 10^{-3}$ | $16 \times 10^{-3}$ | $16 \times 10^{-3}$ | $16 \times 10^{-3}$ | $16 \times 10^{-3}$ | $16 \times 10^{-3}$ | $16 \times 10^{-3}$ |
| Izod Impact Strength After Weather Resistance Test (kgf · cm/cm) | 14 | 18 | 11 | 26 | 20 | 25 | 30 |

| | Example 48 | Example 49 | Example 50 | Example 51 | Example 52 | Example 53 |
|---|---|---|---|---|---|---|
| Blending Composition (part) of Composition: | | | | | | |
| Component (A) | | | | | | |
| A-1 | 10 | 10 | 10 | 10 | 10 | 50 |
| A-2 | — | — | — | — | — | — |
| A-3 | — | — | — | — | — | — |
| A-4 | — | — | — | — | — | — |
| Component (B) | | | | | | |
| B-1 | 40 | 9 | 30 | 30 | 30 | — |
| B-2 | — | — | — | — | — | — |
| B-3 | — | — | — | — | — | — |
| Component (C) | | | | | | |
| C-1 | 30 | 1 | 10 | 10 | 10 | — |
| C-2 | — | — | — | — | — | — |
| C-3 | — | — | — | — | — | — |
| Component (D) | | | | | | |
| Nylon 6 | — | — | 25 | — | 25 | 50 |
| Nylon 4, 6 | — | — | — | — | — | — |
| PBT | — | — | — | 25 | 25 | — |
| PC | 20 | 80 | 25 | 25 | — | — |
| PVC | — | — | — | — | — | — |
| MPP | — | — | — | — | — | — |
| POM | — | — | — | — | — | — |
| PPS | — | — | — | — | — | — |
| Polyarylate | — | — | — | — | — | — |
| PPE 1 | — | — | — | — | — | — |
| PPE 2 | — | — | — | — | — | — |
| Amount (%) of Polyorganosiloxane in Composition | 20 | 7.6 | 16 | 16 | 16 | 20 |
| Amount (%) of carboxyl Group-Having Vinyl Monomer in Composition | 0.3 | 0.3 | 0.3 | 0.3 | 0.3 | 1.5 |
| Evaluation Result: | | | | | | |
| Izod Impact Strength; 23° C. (kgf · cm/cm) −30° C. | 28 / 17 | 25 / 15 | 22 / 13 | 21 / 13 | 20 / 12 | 15 / 9 |
| MFR (g/10 min.) (Temp.) | 21 (240) | 22 (240) | 29 (240) | 18 (240) | 42 (240) | 23 (240) |
| Chemical Resistance: | | | | | | |
| DOP | 1.0 | 1.2 | | | | |
| Brake Fluid | 1.0 | 1.2 | | | | |
| Gloss (%) | 88 | 86 | 86 | 86 | 88 | 82 |
| Weld Strength Retentivity (%) | 92 | 93 | 88 | 89 | 89 | 85 |
| Kinetic Friction Coefficient (with same material) | 0.09 | 0.09 | 0.09 | 0.09 | 0.09 | 0.09 |
| Relative Worn Amount (with same material) | $16 \times 10^{-3}$ | $16 \times 10^{-3}$ | $16 \times 10^{-3}$ | $16 \times 10^{-3}$ | $16 \times 10^{-3}$ | $16 \times 10^{-3}$ |
| Izod Impact Strength After Weather Resistance Test (kgf · cm/cm) | 27 | 24 | 21 | 20 | 19 | 14 |

| | Example 54 | Example 55 | Example 56 | Example 57 | Example 58 | Example 59 | Example 60 |
|---|---|---|---|---|---|---|---|
| Blending Composition (part) of Composition: | | | | | | | |
| Component (A) | | | | | | | |
| A-1 | 10 | 10 | 10 | 10 | 10 | 10 | 10 |
| A-2 | — | — | — | — | — | — | — |
| A-3 | — | — | — | — | — | — | — |
| A-4 | — | — | — | — | — | — | — |
| Component (B) | | | | | | | |
| B-1 | 30 | 30 | 30 | 30 | 30 | 30 | 30 |
| B-2 | — | — | — | — | — | — | — |
| B-3 | — | — | — | — | — | — | — |
| Component (C) | | | | | | | |
| C-1 | 10 | 10 | 10 | 10 | 10 | 10 | 10 |
| C-2 | — | — | — | — | — | — | — |
| C-3 | — | — | — | — | — | — | — |
| Component (D) | | | | | | | |
| Nylon 6 | — | — | — | — | — | — | — |

TABLE 14-continued

| | | | | | | | |
|---|---|---|---|---|---|---|---|
| Nylon 4, 6 | — | — | — | — | — | — | — |
| PBT | — | — | — | — | — | — | — |
| PC | — | — | — | — | — | — | — |
| PVC | 50 | — | — | — | — | — | — |
| MPP | — | 50 | — | — | — | — | — |
| POM | — | — | 50 | — | — | — | — |
| PPS | — | — | — | 50 | — | — | — |
| Polyarylate | — | — | — | — | 50 | — | — |
| PPE 1 | — | — | — | — | — | 50 | — |
| PPE 2 | — | — | — | — | — | — | 50 |
| Amount (%) of Polyorganosiloxane in Composition | 16 | 16 | 16 | 16 | 16 | 16 | 16 |
| Amount (%) of Carboxyl Group-Having Vinyl Monomer in Composition | 0.3 | 0.3 | 0.3 | 0.3 | 0.3 | 0.3 | 0.3 |
| Evaluation Result: | | | | | | | |
| Izod Impact Strength; 23° C. | 18 | 24 | 18 | 20 | 25 | 23 | 30 |
| (kgf · cm/cm) −30° C. | 9 | 11 | 10 | 11 | 12 | 11 | 14 |
| MFR (g/10 min.) (Temp.) | 12 (200) | 33 (220) | 36 (200) | 32 (300) | 30 (300) | 34 (260) | 32 (260) |
| Chemical Resistance: | | | | | | | |
| DOP | 1.2 | | | | | | |
| Brake Fluid | 1.2 | | | | | | |
| Gloss (%) | 75 | 85 | 76 | 78 | 75 | 78 | 83 |
| Weld Strength Retentivity (%) | 81 | 83 | 82 | 84 | 81 | 82 | 85 |
| Kinetic Friction Coefficient (with same material) | 0.09 | 0.09 | 0.09 | 0.09 | 0.09 | 0.09 | 0.09 |
| Relative Worn Amount (with same material) | $20 \times 10^{-3}$ | $18 \times 10^{-3}$ | $13 \times 10^{-3}$ | $15 \times 10^{-3}$ | $16 \times 10^{-3}$ | $16 \times 10^{-3}$ | $16 \times 10^{-3}$ |
| Izod Impact Strength After Weather Resistance Test (kgf · cm/cm) | 17 | 23 | 17 | 19 | 24 | 22 | 29 |

While the invention has been described in detail and with reference to specific embodiments thereof, it will be apparent to one skilled in the art that various changes and modifications can be made therein without departing from the spirit and scope thereof.

What is claimed is:

1. A polyorganosiloxane series thermoplastic resin comprising a graft copolymer (V) obtained by graft polymerizing at least one kind of a vinyl monomer (IV) to a modified polyorganosiloxane (III) obtained by condensing a mixture consisting essentially of from 90 to 99.9% by weight of an organosiloxane (I) having a structure unit represented by the following formula (A)

$$R^1{}_n SiO_{(4-n)/2} \qquad (A)$$

wherein $R^1$ represents a monovalent hydrocarbon group or a monovalent hydrocarbon group substituted by halogen, cyano or a UV absorbing group, and n represents 0 or an integer of from 1 to 3, with from 10 to 0.2% by weight of a graft crosslinking agent (II) having both an unsaturated group represented by the following formula (B)

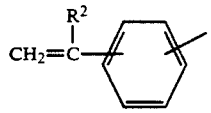

wherein $R^2$ represents a hydrogen atom or an alkyl group having form 1 to 6 carbon atoms, and an alkoxysilyl group.

2. The polyorganosiloxane series thermoplastic resin as in claim 1, wherein 0.02 to 10% of $R^1$ in the formula (A) is a group containing a UV absorbing group.

3. The polyorganosiloxane series thermoplastic resin as in the residual group of $R^1$ in the formula (A) is at least one group selected from a methyl group, an ethyl group, a propyl group, a vinyl group, a phenyl group or those groups substituted with a halogen atom or a cyano group.

4. The polyorganosiloxane series thermoplastic resin as in claim 1, wherein the residual group of $R^1$ in the formula (A) is at least one group selected from a methyl group, a vinyl group or a phenyl group.

5. The polyorganosiloxane series thermoplastic resin as in claim 2, wherein the group containing the UV absorbing group has a structure represented by the following formula (II)

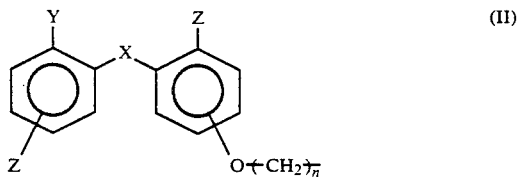

wherein X represents >C=O or

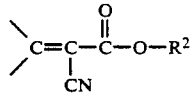

wherein $R^2$ represents an alkyl group having from 1 to 18 carbon atoms, Y represents H or OH, Z represents H, OH or $OR^2$ wherein $R^2$ is the same as defined above, and n represents an integer of from 1 to 5, with proviso that when Y is H, at least one Z is OH.

6. The polyorganosiloxane series thermoplastic resin as in claim 1, wherein the graft crosslinking agent (II) is at least one member selected from p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)propylmethyldiethoxysilane, 3-(p-vinylbenzoyloxy)propylmethyldimethoxysilane, 1-(o-vinylphenyl)-1,1,2-trimethyl-2,2-dimethoxydisilane, 1-(p-vinylphenyl)-1,1-diphenyl-3-ethyl-3,3-diethoxydisiloxane, m-vinylphenyl-3-(triethoxysilyl)propyldiphenylsilane or [3-(p-isopropenylbenzoylamino)propyl]phenyldipropoxysilane.

7. The polyorganosiloxane series thermoplastic resin as in claim 1, wherein the modified polyorganosiloxane (III) is obtained by polycondensing a mixture consisting essentially an organosiloxane (I') having the structural unit represented by the following formula (A')

$$R^3{}_n SiO_{(4-n)/2} \quad (A')$$

wherein $R^3$ represents a monovalent hydrocarbon group or monovalent hydrocarbon group substituted by halogen or cyano, and n represents 0 or an integer of from 1 to 3, with a graft crosslinking agent (II) having both a reactive unsaturated group and an alkoxy group, and an organic silicone compound (VI) having both a group containing a UV absorbing group and an alkoxy group in the presence of an emulsifying agent.

8. The polyorganosiloxane series thermoplastic resin as in claim 7, wherein the emulsifying agent is at least one member selected from an aliphatic substituted benzenesulfonic acid, an aliphatic substituted naphthalenesulfonic acid, an aliphatic sulfonic acid, a silylalkylsulfonic acid, and aliphatic substituted diphenyl ether sulfonic acid, each aliphatic group having a carbon chain length of from 6 to 18 carbon atoms.

9. The polyorganosiloxane series thermoplastic resin as in claim 1, wherein the silicon atom number in the modified polyorganosiloxane (III) is from 100 to 10,000.

10. The polyorganosiloxane series thermoplastic resin as in claim 1, wherein the polystyrene calculated weight average molecular weight of the modified polyorganosiloxane (III) is from 10,000 to 5,000,000.

11. The polyorganosiloxane series thermoplastic resin as in claim 1, wherein the vinyl monomer (IV) is at least one member selected from styrene, α-methylstyrene, sodium styrenesulfonate, methyl methacrylate, ethyl methacrylate, 2-ethylhexyl methacrylate, butyl methacrylate, allyl methacrylate, methyl acrylate, ethyl acrylate, butyl acrylate, hydroxyethyl methacrylate, dimethylaminoethyl methacrylate, acrylonitrile, methacrylonitrile, ethylene, propylene, butadiene, isoprene, chloroprene, vinyl acetate, vinyl chloride, vinylidene chloride, triallyl isocyanurate, acrylic acid, methacrylic acid, N-phenylmaleimide, N-cyclohexylmaleimide, maleic anhydride, crotonic acid, cinnamic acid, itaconic acid, maleic acid, glycidyl methacrylate, glycidyl acrylate, vinylglycidyl ether, allylglycidyl ether, glycidyl ether of hydroxyalkyl (meth)acrylate, glycidyl ether of polyalkylene glycol (meth)acrylate, or glycidyl itaconate.

12. The polyorganosiloxane series thermoplastic resin as in claim 1, wherein the vinyl monomer (IV) comprises at least one member selected from a carboxyl group-containing vinyl monomer or an epoxy group-containing vinyl monomer, and another vinyl monomer.

13. The polyorganosiloxane series thermoplastic resin as in claim 1, wherein the graft ratio of the graft copolymer (V) is at least 20% by weight.

14. The polyorganosiloxane series thermoplastic resin as in claim 1, wherein the graft ratio of the graft copolymer (V) is at least 80% by weight.

15. The thermoplastic series thermoplastic resin as in claim 1, wherein the organopolysiloxane (I) is octamethylcyclotetrasiloxane, the graft crosslinking agent (II) is p-vinylphenylmethyldimethoxysilane, and vinyl monomer (IV) is styrene and acrylonitrile.

* * * * *